(12) United States Patent
Wilhelmsson et al.

(10) Patent No.: US 8,472,538 B2
(45) Date of Patent: Jun. 25, 2013

(54) METHOD AND APPARATUS FOR DELAY SPREAD ESTIMATION

(75) Inventors: Leif Wilhelmsson, Dalby (SE); Bo Bernhardsson, Lund (SE); Lars Björkman, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 362 days.

(21) Appl. No.: 12/746,604

(22) PCT Filed: Dec. 8, 2008

(86) PCT No.: PCT/EP2008/066999
§ 371 (c)(1),
(2), (4) Date: Oct. 4, 2010

(87) PCT Pub. No.: WO2009/074529
PCT Pub. Date: Jun. 18, 2009

(65) Prior Publication Data
US 2011/0019749 A1 Jan. 27, 2011

Related U.S. Application Data

(60) Provisional application No. 61/013,351, filed on Dec. 13, 2007.

(30) Foreign Application Priority Data

Dec. 10, 2007 (EP) ..................... 07122776

(51) Int. Cl.
*H04L 27/28* (2006.01)
(52) U.S. Cl.
USPC ........... 375/260; 375/259; 375/316; 375/329; 375/334; 375/340
(58) Field of Classification Search
USPC .................. 375/259, 260, 316, 324, 322, 329, 375/334, 340
See application file for complete search history.

(56) References Cited

U.S. PATENT DOCUMENTS 6,058,121 A * 5/2000 Kim et al. ..................... 370/480
6,650,617 B1 * 11/2003 Belotserkovsky et al. ... 370/210
(Continued)

FOREIGN PATENT DOCUMENTS

| EP | 1 675 335 A1 | 6/2006 |
| EP | 2071787 A1 | 6/2009 |
| WO | 2006/111276 A1 | 10/2006 |

OTHER PUBLICATIONS

PCT International Search Report, dated Apr. 9, 2009, in connection with International Application No. PCT/EP2008/066999.

(Continued)

*Primary Examiner* — Kenneth Lam
(74) *Attorney, Agent, or Firm* — Potomac Patent Group PLLC

(57) ABSTRACT

Methods for calculating a delay spread estimate in an OFDM-receiver are described, along with computer program products and electronic apparatuses for performing the methods. The methods comprise determining a position of an FFT-window in relation to one or more OFDM-symbols of a received OFDM-signal and using the determined position to obtain a first OFDM-symbol from the received OFDM-signal. An FFT is applied to the first OFDM-symbol to produce an FFT-output signal. A frequency dependent phase rotation component of the FFT-output signal is determined and removed from the FFT-output signal. A number of zero-crossings of at least one of a real component and an imaginary component of a transfer function of a channel, over which the received OFDM-signal has been transmitted, derived from the FFT-output signal where the frequency dependent phase rotation component has been removed is determined, and a delay spread estimate is calculated based on the determined number of zero-crossings.

28 Claims, 11 Drawing Sheets

U.S. PATENT DOCUMENTS

| | | | |
|---|---|---|---|
| 7,440,506 B2 * | 10/2008 | Atungsiri et al. | 375/260 |
| 7,602,852 B2 * | 10/2009 | Berkeman et al. | 375/260 |
| 2003/0026360 A1 * | 2/2003 | Ramasubramanian et al. | 375/343 |
| 2004/0005010 A1 * | 1/2004 | He et al. | 375/260 |
| 2004/0105512 A1 * | 6/2004 | Priotti | 375/340 |
| 2006/0159203 A1 | 7/2006 | Poloni et al. | |
| 2006/0203710 A1 * | 9/2006 | Mukkavilli et al. | 370/208 |
| 2006/0215778 A1 * | 9/2006 | Murthy et al. | 375/260 |
| 2006/0239364 A1 * | 10/2006 | Wilhelmsson | 375/260 |
| 2008/0219144 A1 * | 9/2008 | Brehler et al. | 370/203 |
| 2011/0002403 A1 * | 1/2011 | Wilhelmsson et al. | 375/260 |

OTHER PUBLICATIONS

Ramasubramanian, K. et al. "An OFDM timing recovery scheme with inherent delay-spread estimation" 2001 IEEE Global Telecommunications Conference. San Antonio, TX, Nov. 25-29, 2001. New York, NY, US, vol. 5, Nov. 25, 2001, pp. 3111-3115. XP010747382, ISBN: 978-0-7803-7206-1.

Van De Beek, J. J. et al. "A Time and Frequency Synchronization Scheme for Multiuser OFDM", IEEE Journal on Selected Areas in Communications, vol. 17, No. 11, Nov. 1999.

Witrisal, K. "On estimating the RMS delay spread from the frequency-domain level crossing rate", IEEE Commun. Letters, Jul. 2001, pp. 287-289.

* cited by examiner

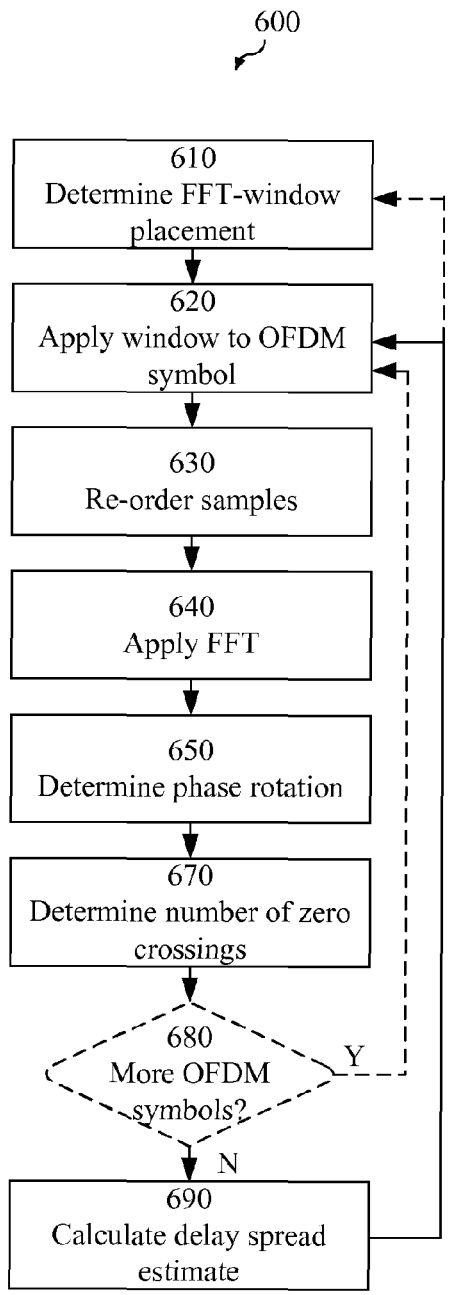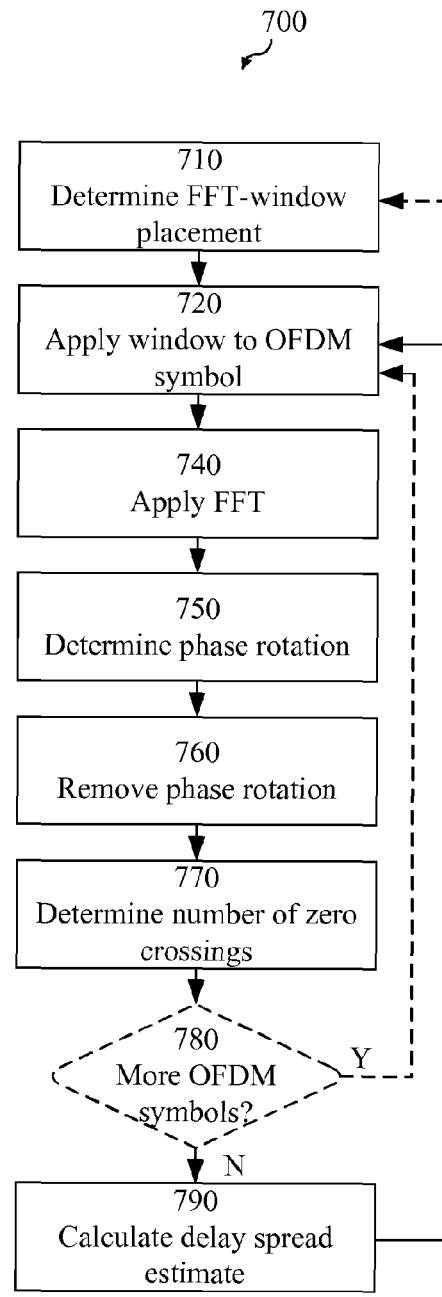
Fig. 6
Fig. 7

METHOD AND APPARATUS FOR DELAY SPREAD ESTIMATION

CROSS-REFERENCE TO RELATED APPLICATIONS

This application claims priority under 35 U.S.C. §119 to European Patent Application No. 07122776.3, filed Dec. 10, 2007, which is hereby incorporated herein by reference in its entirety. This application also claims the benefit of U.S. Provisional Application No. 61/013,351, filed Dec. 13, 2007, which is hereby incorporated herein by reference in its entirety.

TECHNICAL FIELD

The present invention relates generally to the field of processing received signals in communication systems. More particularly, it relates to the calculation of delay spread estimates.

BACKGROUND

Orthogonal Frequency Division Multiplexing (OFDM) is an access technique that is being used in wireless local area networks (WLAN), such as IEEE 802.11a, and IEEE802.11g, as well as in different standards for broadcast, such as Digital Video Broadcasting—Terrestrial (DVB-T), DVB—Handhelds (DVB-H), Terrestrial Digital Multimedia Broadcasting (T-DMB), and Digital Audio Broadcasting (DAB). It is also the chosen access technique for Universal Mobile Telecommunications System—Long Term Evolution (UMTS LTE), a telecommunication standard promulgated by the $3^{rd}$ Generation Partnership Project (3GPP).

In OFDM, the data is transmitted in parallel on a number of sub-carriers, which may be efficiently implemented by using an inverse fast Fourier transform (IFFT) in the transmitter, and a fast Fourier transform (FFT) in the receiver. If the size of the FFT is N, then N samples at the output of the FFT are referred to as an OFDM-symbol (i.e. a frequency domain OFDM-symbol). Typical values of N may range from 64 (used in e.g. WLAN) to 8192 (used in e.g. DVB-T). Values outside this range may, however, also be applicable.

In wireless communication, there is often a discrepancy between the transmitted and the received signal. This discrepancy may typically be due to a multi-path channel and noise. A multi-path channel, over which the signal is transmitted, often introduces time-dispersion to the signal. This may have the effect that symbols transmitted at different instants of time will interfere with one another to a certain extent at the receiver. This phenomenon is commonly referred to as inter-symbol interference (ISI). In OFDM, a cyclic prefix (CP) may be used to mitigate, at least partly, any negative impact resulting from ISI.

An illustration of a transmitted OFDM-signal with cyclic prefixes is provided in FIG. 1. In the figure, it is illustrated how the CP 110 may be created by copying the last part 120 of an OFDM-symbol 130 output from the IFFT and appending the copy just before the symbol. Thus, a transmitted (time domain) OFDM-symbol comprises the actual OFDM-symbol (or the useful part of the OFDM-symbol) 130 and a CP 110.

At the receiver side, a part of the received signal corresponding to the CP may be discarded before the signal is demodulated by the FFT. The issue of determining which part of the signal should be discarded and which part should be input to the FFT is commonly referred to as time synchronization. Throughout the application, time-synchronization will be referred to as positioning or placement of an FFT-window. In FIG. 2, an illustration of a possible placement of the FFT-window 210 is shown. In FIG. 2, it is also illustrated that the initial part 230 of the CP 220 has been corrupted due to ISI.

In communication systems where high bandwidth efficiency is desired, it is an advantage to have an estimation of the communication channel. The estimation is commonly determined in a channel estimator in the receiver. Estimating the communication channel may comprise estimating the impulse response of the channel if the channel is estimated in the time domain. If the channel is estimated in the frequency domain, the estimation may comprise estimating the transfer function of the channel. When a communication system is based on, for example, direct-sequence spread spectrum (DSSS), as is the case in the UMTS standard for Wideband Code Division Multiple Access (WCDMA), the channel is typically estimated in the time domain. When a system is based on OFDM on the other hand, the channel may typically be estimated in the frequency domain.

Channel estimation is one of the most critical tasks within a communication receiver in order to obtain good performance. It is typically also one of the more computationally intensive tasks in the receiver.

One approach to enable channel estimation is to transmit one or more known symbols and use these symbols for channel estimation. The known symbols may be transmitted separately as is done on the Common PIlot CHannel (CPICH) of UMTS. The known symbols may also be transmitted among the actual data as is done in OFDM for UMTS-LTE. The known symbols are commonly referred to as pilot symbols or reference symbols.

FIG. 3 illustrates an example distribution of pilot symbols 310a-h within a time-frequency grid of transmitted signals in an OFDM-system. FIG. 3 illustrates example OFDM-signals before IFFT-processing in the transmitter. The corresponding time-frequency grid will be found in the receiver after FFT-processing. In FIG. 3, it may be noted that pilot symbols 310a and 310b are transmitted in OFDM-symbol 301, that OFDM-symbols 302, 303, and 304 do not comprise any pilot symbols, and that pilot symbols 310c and 310d are transmitted in OFDM-symbol 305. Furthermore, it may be noted that pilot symbols 310a and 310b are transmitted on different sub-carriers compared to pilot symbols 310a and 310b.

When the channel has been estimated at the positions where there are pilot symbols available, using any known method for channel estimation, the channel may also be estimated at the other positions in the time-frequency grid. One way of performing this estimation is by means of interpolation in frequency and/or in time. For this purpose, finding a suitable interpolation filter, that may be used to interpolate between the channel estimates at the positions of the pilot symbols, may be an important part of the setting up the channel estimation process.

For interpolation in time, the filter may be chosen based on how fast the channel is changing in the time direction. This type of channel variation is commonly referred to as the Doppler spread of the channel. Similarly, for interpolation in frequency, the filter may be chosen based on how frequency selective the channel is. This channel variation in the frequency direction is caused by the delay spread of the channel. There is a linear relation between the delay spread of the channel and how selective the channel is.

If, for example, a Wiener filter is used for interpolation between the channel estimates at the pilot symbol positions, the filter parameters may be chosen based on the correlation function of the channel in both time and frequency. The correlation functions in time and frequency can be estimated from the Doppler spread and the delay spread respectively. Knowledge of the Doppler spread and the delay spread may also be useful for simpler channel estimation approaches. For example, the Doppler spread and the delay spread may be used to determine an appropriate amount of filtering for interpolation in time and frequency respectively.

Thus, it is important to have an accurate estimate of the Doppler spread and of the delay spread.

The delay spread of the channel may be obtained by estimating what the impulse response looks like. This may, for instance, include processing of the received signal prior to FFT-processing. Estimating the actual impulse response to accomplish a delay spread estimate may be a rather complex approach. If, for example, the delay spread estimate will only be used to determine an appropriate amount of filtering in the frequency direction, a relatively rough estimate of the delay spread often suffice, and it may be a waste of resources to apply a complex delay spread estimation process.

An estimate of the delay spread of the channel may alternatively be obtained by making use of the linear relationship mentioned above, which may result in less complex delay spread estimation procedures.

K. Witrisal "On estimating the RMS delay spread from the frequency-domain level crossing rate", IEEE Commun. Letters, July 2001, pp. 287-289, discloses a method where this linear relationship was exploited by evaluating the number of crossings of a level of the amplitude of a transfer function. One problem encountered for algorithms that are based on estimating a level-crossing rate, so called level-crossing algorithms, is that the average power of the signal must be determined since the level should relate to this average power. Estimating the power may not necessarily be a complex operation. However, in case the average power, and thereby the level, is not estimated with sufficient accuracy, the accuracy of the delay spread estimate will be inferior.

U.S. 2006/0159203 A1 discloses a procedure of channel estimation in a transmission channel with memory. An operation of estimation of a delay spread comprises evaluation of a mean number of crossings of the real and imaginary parts of the channel transfer function. This approach is commonly referred to as a zero-crossing algorithm. It does not rely on an estimate of the average power, and is hence more robust than a level-crossing algorithm.

One problem with zero-crossing algorithms is that the delay spread may be biased, i.e. over-estimated or under-estimated, under certain circumstances. In particular over-estimation is known to be a problem. Thus, there is a need for accurate, low complex and robust methods and apparatuses for delay spread estimation.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods and apparatuses for calculating a delay spread estimate in an OFDM-receiver.

According to a first aspect of the invention, this is achieved by a method for calculating a delay spread estimate in an OFDM-receiver. The method comprises determining a position of an FFT-window in relation to one or more OFDM-symbols of a received OFDM-signal, using the determined position to obtain a first OFDM-symbol from the received OFDM-signal, applying an FFT to the first OFDM-symbol to produce an FFT-output signal, determining a number of zero-crossings of at least one of a real component and an imaginary component of a transfer function of a channel over which the received OFDM-signal has been transmitted, and calculating the delay spread estimate based on the determined number of zero-crossings. Furthermore, the method comprises determining a frequency dependent phase rotation component of the FFT-output signal, and removing the determined frequency dependent phase rotation component from the FFT-output signal, prior to the step of determining the number of zero-crossings. Removing the determined frequency dependent phase rotation component from the FFT-output signal is performed to obtain a compensated FFT-output signal, and the transfer function is determined based on the compensated FFT-output signal.

Determining the position of the FFT-window is a time synchronization task, and according to some embodiments, this step may be performed as described in a European patent application to Telefonaktiebolaget LM Ericsson (publ.) with the title "Method and apparatus for positioning an FFT-window in an OFDM-receiver", having U.S. application Ser. No. 12/746,518, and filed at the same date as the current application.

In some embodiments, the step of determining a frequency dependent phase rotation component of the FFT-output signal may comprise determining an average frequency dependent phase rotation component.

In one or more embodiments, the step of calculating the delay spread estimate may comprise determining a zero-crossing rate based on the determined number of zero-crossings, and multiplying the determined zero-crossing rate by a scale factor. In some embodiments, the scale factor may have a constant value. In some embodiments, the scale factor may be a function of the determined zero-crossing rate, or it may be a function of the signal-to-noise level of the FFT-output signal.

In one or more embodiments, multiplying the determined zero-crossing rate by a scale factor may produce an intermediate delay spread estimate. The step of calculating the delay spread estimate may further comprise adjusting the intermediate delay spread estimate based on the determined zero-crossing rate and/or the signal-to-noise level of the FFT-output signal.

In one or more embodiments, the method may further comprise performing, for at least a second OFDM-symbol of the received OFDM-signal, at least the steps of: using the determined position to obtain the second OFDM-symbol from the received OFDM-signal, applying the FFT to the second OFDM-symbol to produce an FFT-output signal, determining a frequency dependent phase rotation component of the FFT-output signal, removing the determined frequency dependent phase rotation component from the FFT-output signal to obtain a compensated FFT-output signal, and determining a number of zero-crossings of at least one of a real component and an imaginary component of the transfer function, wherein the transfer function is determined based on the compensated FFT-output signal. The step of calculating the delay spread estimate based on the determined number of zero-crossings may in these embodiments comprise calculating the delay spread estimate based on at least a determined number of zero-crossings associated with the first OFDM-symbol and a determined number of zero-crossings associated with the at least second OFDM-symbol.

In some embodiments, filtering at least one of the determined number of zero-crossings, a zero-crossing rate, and the calculated delay spread estimate may be performed.

The step of removing the determined frequency dependent phase rotation component may, in some embodiments, be performed prior to the step of applying the FFT to the first or second OFDM-symbol and may comprise re-ordering samples of the first or second OFDM-symbol based on the determined frequency dependent phase rotation component. The step of removing the determined frequency dependent phase rotation component may, in some embodiments, be performed after the step of applying the FFT to the first OFDM-symbol and may comprise de-rotating samples of the FFT-output signal.

In one or more embodiments, the step of determining the number of zero-crossings may comprise initiating a counter, and incrementing the counter for a first registered zero-crossing. The step of determining may further comprise iterating, for each registered zero-crossing, the following steps: if the registered zero-crossing is a zero-crossing of the real component, incrementing the counter only if the previously registered zero-crossing was a zero-crossing of the imaginary component, and if the registered zero-crossing is a zero-crossing of the imaginary component, incrementing the counter only if the previously registered zero-crossing was a zero-crossing of the real component.

In accordance with some embodiments, the method may further comprise quantizing the calculated delay spread estimate.

A second aspect of the invention is a computer program product comprising a computer readable medium, having thereon a computer program comprising program instructions, the computer program being loadable into a data-processing unit and adapted to cause the data-processing unit to execute the method according to the first aspect when the computer program is run by the data-processing unit.

A third aspect of the invention is an electronic apparatus for calculating a delay spread estimate in an OFDM-receiver. The electronic apparatus comprises FFT-window placement circuitry adapted to determine a position of an FFT-window in relation to one or more OFDM-symbols of a received OFDM-signal and to use the position of the FFT-window to obtain at least one OFDM-symbol from the received OFDM-signal, FFT circuitry adapted to produce an FFT-output signal from the at least one OFDM-symbol, and at least one delay spread estimator adapted to determine a number of zero-crossings of at least one of a real component and an imaginary component of a transfer function of a channel over which the received OFDM-signal has been transmitted, and to calculate the delay spread estimate based on the determined number of zero-crossings. The electronic apparatus further comprises circuitry adapted to determine a frequency dependent phase rotation component of the FFT-output signal, circuitry adapted to remove the determined frequency dependent phase rotation component from the FFT-output signal to obtain a compensated FFT-output signal, and circuitry adapted to determine the transfer function based on the compensated FFT-output signal.

The third aspect may additionally have features identical with or corresponding to any of the various features explained above for the first aspect of the invention.

In one or more embodiments, the electronic apparatus according to the third aspect may further comprise a filter associated with the at least one delay spread estimator.

The electronic apparatus according to the third aspect may, in some embodiments, further comprise a channel estimator adapted to determine at least one setting of a channel estimation algorithm based on the calculated delay spread estimate.

The electronic apparatus according to the third aspect complies with the Universal Mobile Telecommunications System Long Term Evolution standard in one or more embodiments.

In some embodiments, the electronic apparatus according to the third aspect may be a portable or handheld mobile radio communication equipment, a mobile radio terminal, a mobile telephone, a pager, a communicator, an electronic organizer, a smart-phone, a computer, an embedded drive, a mobile gaming device, a watch or a base station.

One of the advantages of embodiments of the invention is that method and apparatuses for calculating a delay spread estimate are achieved, which are robust, have low complexity and are not sensitive to over- or under-estimation.

BRIEF DESCRIPTION OF THE DRAWINGS

Further objects, features and advantages of the invention will appear from the following detailed description of embodiments of the invention, with reference being made to the accompanying drawings, in which:

FIG. 6 is a flow chart illustrating a method for calculating a delay spread estimate according to some embodiments of the invention;

FIG. 7 is a flow chart illustrating a method for calculating a delay spread estimate according to some embodiments of the invention;

DETAILED DESCRIPTION

Figure 1:
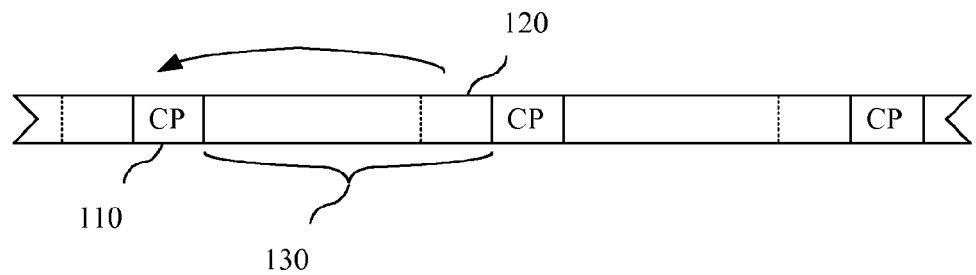
FIG. 1 is a diagram illustrating an example transmitted OFDM-signal.
Figure 2:
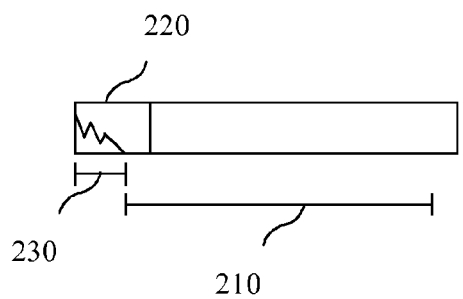
FIG. 2 is a diagram illustrating inter-symbol interference and an example FFT-window placement for an OFDM-symbol.

In the following, a number of embodiments of the invention will be presented wherein a delay spread estimate is calculated in an OFDM-receiver. Throughout the description, example embodiments of the invention will focus on UMTS LTE. It should be noted, however, that this is done to simplify the description and is by no means limiting to the invention.

Contrarily, embodiments of the invention are equally applicable to other communication standards based on OFDM such as, for example, IEEE 802.11a, IEEE802.11g, WiMAX (IEEE 802.16), DVB-T, DVB-H, T-DMB, and DAB.

Furthermore, embodiments of the invention are described for an OFDM-system where parameters have specific numerical values. This is done to simplify the description and to ease the illustration of embodiments of the invention, and is by no means intended to limit the scope of the invention. It is obvious to a skilled artisan that embodiments of the invention are equally applicable for other choices of parameter values.

Some embodiments of the invention will be described for a specific definition of the delay spread, namely the root mean square (rms) delay spread. However, a person skilled in the art will recognize that these embodiments are equally applicable for alternative delay spread definitions, such as excess delay and maximum delay spread. In these cases, the parameter values will have to be changed accordingly. The parameter values for alternative delay spread definitions may be found, for example, by running simulations or performing measurements.

The parameters chosen to illustrate embodiments of the invention are as follows: The sub-carrier spacing is 15 kHz and the total number of available sub-carriers is 1200 (excluding the sub-carrier transmitted at DC). Consequently, the totally occupied bandwidth amounts to roughly 18 MHz. The sub-carriers are divided into resource blocks, each containing 12 sub-carriers. Moreover, each resource block consists of 7 OFDM-symbols. The sampling rate is 30.72 MHz and the FFT size is N=2048.

One problem with using zero-crossing algorithms to estimate the delay spread of an OFDM-signal is that the delay spread may be over-estimated or under-estimated under certain circumstances. Such an over- or under-estimation may severely affect performance of algorithms in which the delay spread estimate is used. For example, if the delay spread estimate is used to select which interpolation filer to apply in a channel estimation algorithm, an over-estimated delay spread may result in the use of a filter, which is too wide. This in turn may yield noisier channel estimations, and the performance of the channel estimator would be degraded.

For example, non-perfect time synchronization (e.g., a placement of the FFT-window that includes part of the CP) may cause a phase drift over the sub-carriers in an OFDM-symbol of the FFT-output. This in turn may yield extra zero crossings (crossings of the real and/or imaginary axis in the IQ-plane) compared to those caused by the delay spread. This will lead to an over-estimation of the delay spread, which may be rather severe. A placement of the FFT-window that includes part of the subsequent OFDM-symbol (a late FFT-window placement) may also cause a phase drift over the sub-carriers in an OFDM-symbol of the FFT-output. In this case, however, the phase drift may counteract phase variations caused by the delay spread, and lead to a decreased amount of zero crossings and an under-estimation of the delay spread.

Figure 4:
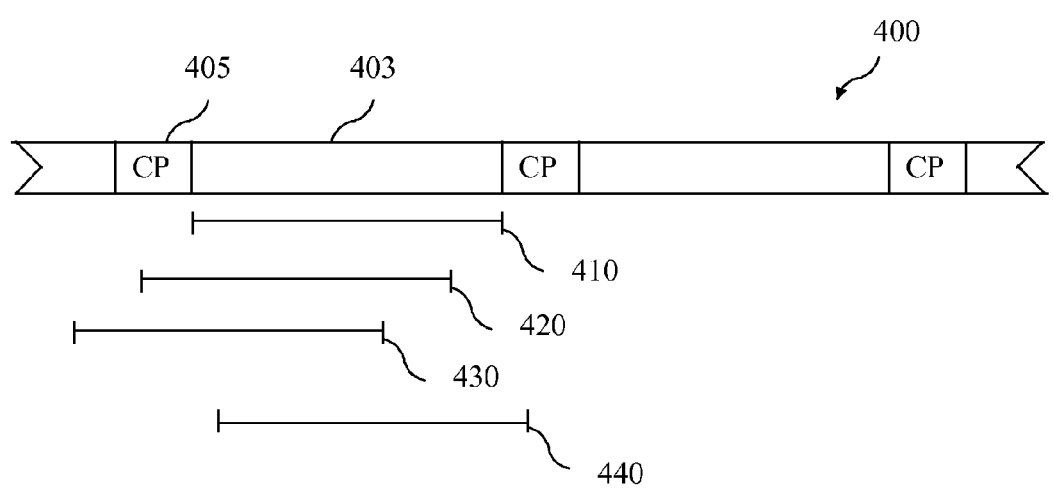
FIG. 4 is a diagram illustrating different example placements of the FFT-window.

FIG. 4 illustrates a received OFDM-signal 400, comprising a useful part of an OFDM-symbol 403 and corresponding cyclic prefix (CP) 405. A number of different placements of the FFT-window 410, 420, 430, 440 are shown in FIG. 4 in relation to the received OFDM-symbol 403 and its cyclic prefix 405. FFT-window placement 410 is in perfect synchronization with the useful part of the OFDM-symbol 403, while FFT-window placements 420, 430 and 440 are not perfectly synchronized with the useful part of the OFDM-symbol 403. Placements 430 and 440 are erroneous placements that will lead to inter-symbol interference, since they overlap the previous symbol and the cyclic prefix of the following symbol respectively. Placement 420, however, is applicable due to the cyclic prefix. Using placement 420 to select the FFT input will, however, result in a phase drift in the transfer function of the FFT-output.

Hence, a placement of the FFT-window that includes part of the CP (of either the same OFDM-symbol or of the subsequent OFDM-symbol) causes a phase drift in the FFT-output, i.e. different sub-carriers of the FFT-output within the same OFDM-symbol are subject to different phase shifts. This phase drift manifests itself as a rotation factor when studying the transfer function in the IQ-plane after the FFT has been applied. It should be noted that the rotation is in the frequency direction as opposed to the case of a frequency offset, when a rotation is seen in the time direction. In the following, the phase drift will be referred to as frequency dependent phase rotation, or phase rotation for short. Thus, a phase rotation may be due to an early (or lately) placed FFT-window. Additionally, or alternatively, a phase rotation may be due to the delay spread of the channel.

FIGS. 5a-d are diagrams illustrating example transfer function components. In these figures, however, the transfer function is not shown in the IQ-plane for clarity. In stead the transfer function is represented by phase- and magnitude-diagrams in FIGS. 5a-d. Hence, zero (or axis) crossings in an IQ-diagram correspond to that the phase function crosses $2\pi k$ thresholds in these figures, where k is an integer.

The phase rotation may cause additional zero crossings as mentioned above, which is illustrated in FIGS. 5a-d.

Figure 5A:
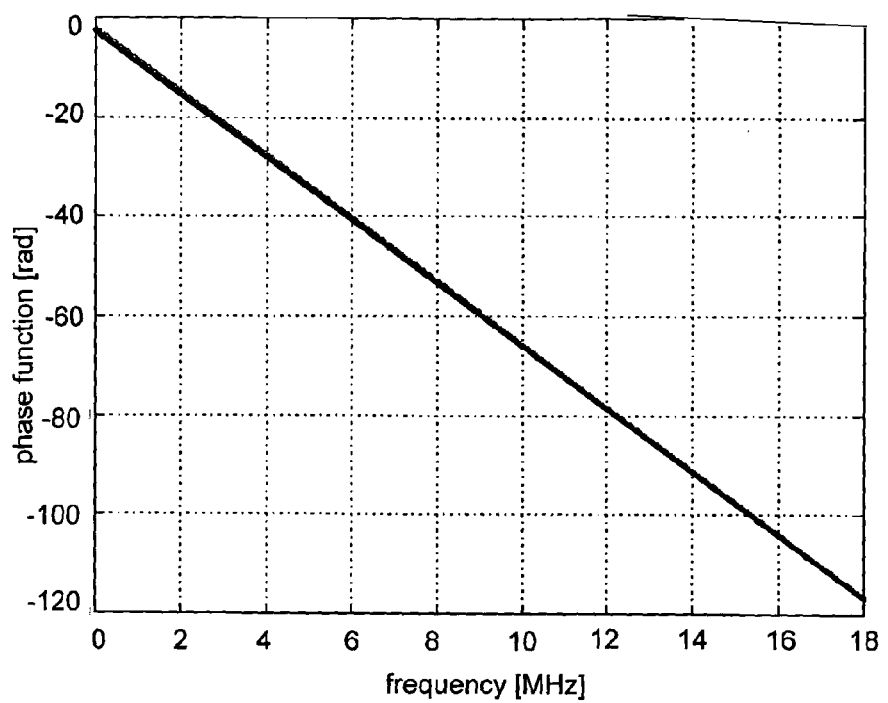
FIGS. 5a, 5b, 5c and 5d are diagrams illustrating example transfer function components.
Figure 5A:
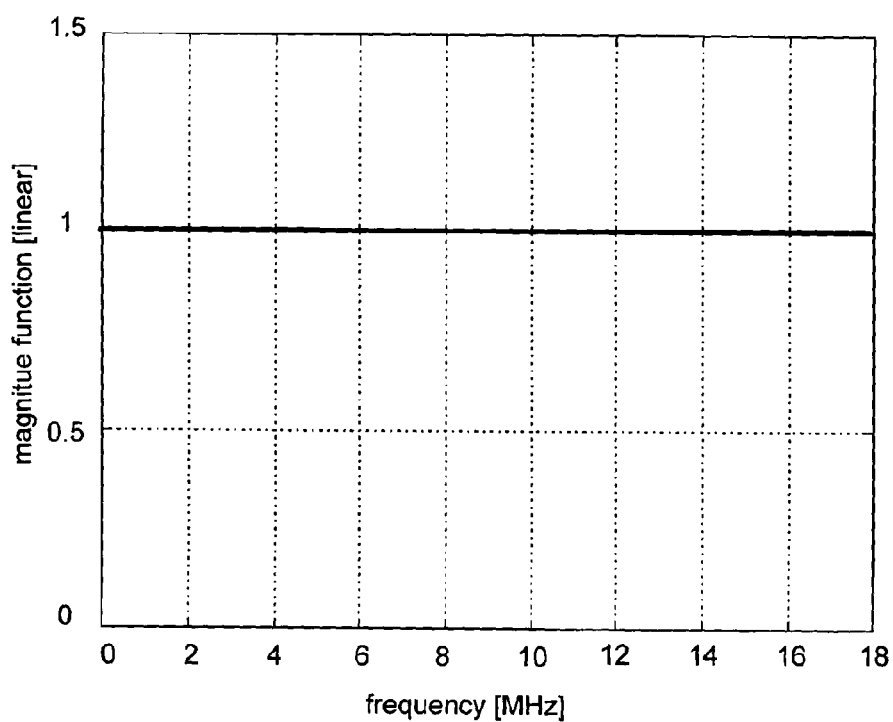

In FIG. 5a, the transfer function is shown for a case when the FTT window overlaps 1 μs of the CP, and no noise or delay spread was present.

Figure 5B:
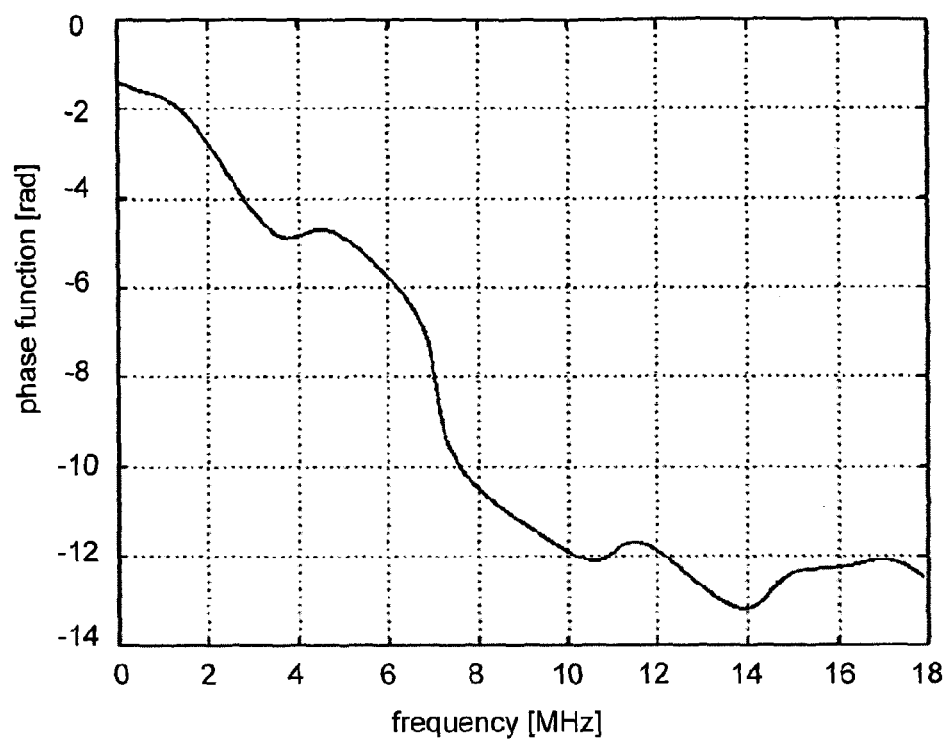
Figure 5B:
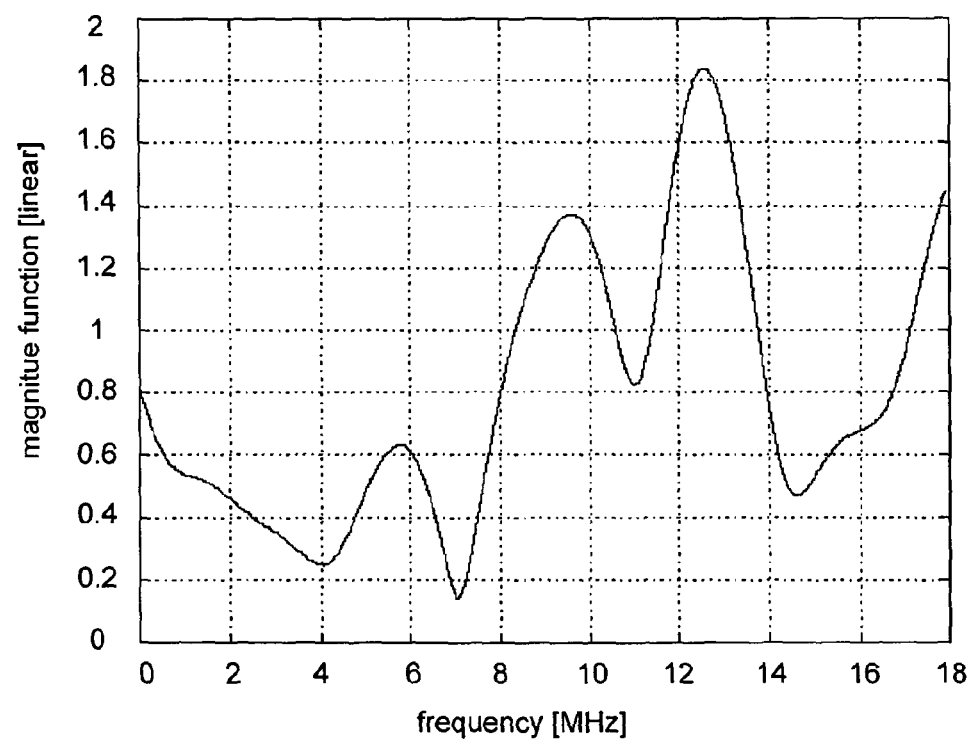

FIG. 5b, illustrates the transfer function for a case with perfect FFT-window placement and no noise, where the delay spread was 0.1 μs (rms delay spread). Hence, this is the component of the transfer function that the delay spread estimation algorithms are trying to estimate.

Figure 5C:
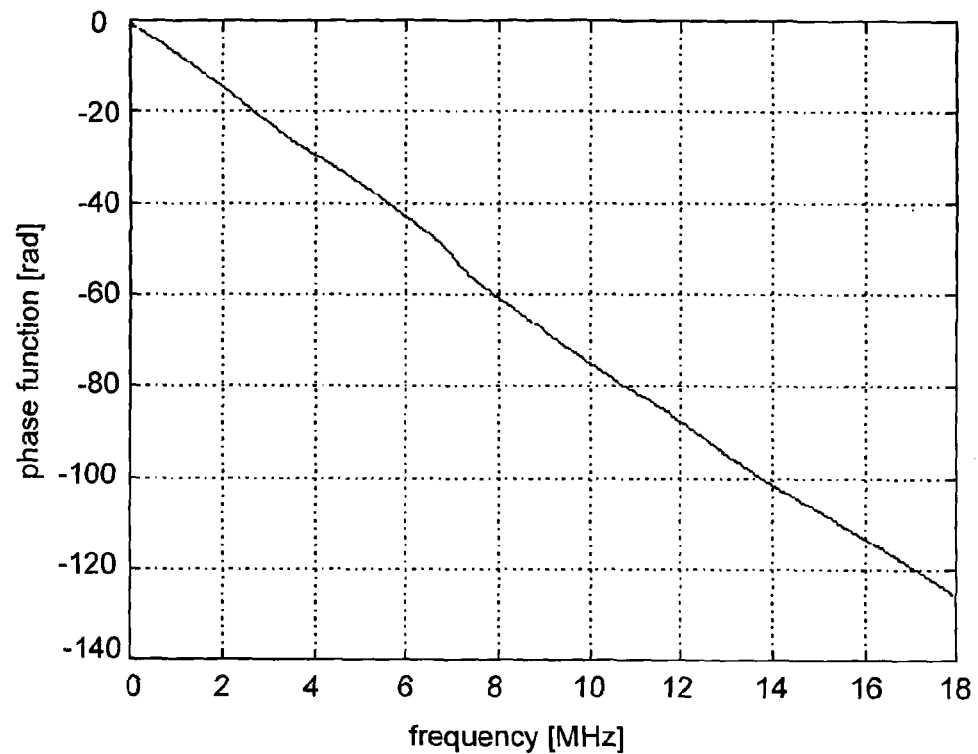
Figure 5C:
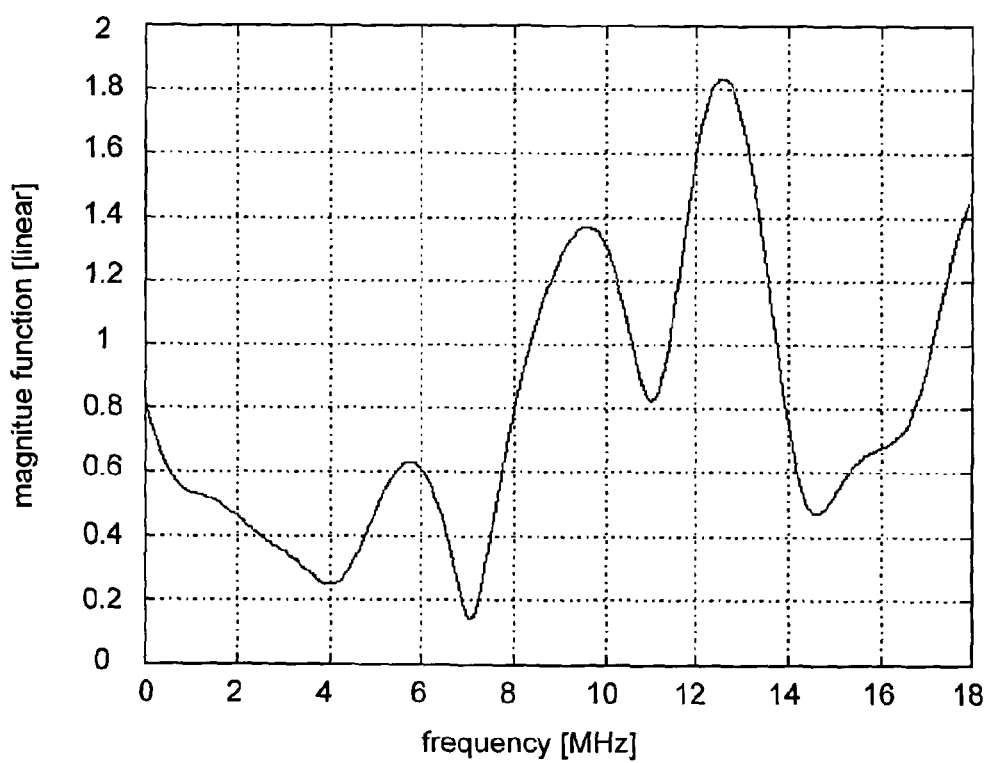

In FIG. 5c the transfer function is shown for a case with the same delay spread as in FIG. 5b and the same FFT-window placement as in FIG. 5a, that is, a superposition of FIGS. 5a and 5b. It can be clearly seen from FIG. 5c that the early FFT-window placement from FIG. 5a causes additional axis crossings compared to the number of crossings in FIG. 5b. In fact, the effect of the delay spread on the phase function will be very hard to detect in the presence of the phase rotation component in this example.

Figure 5D:
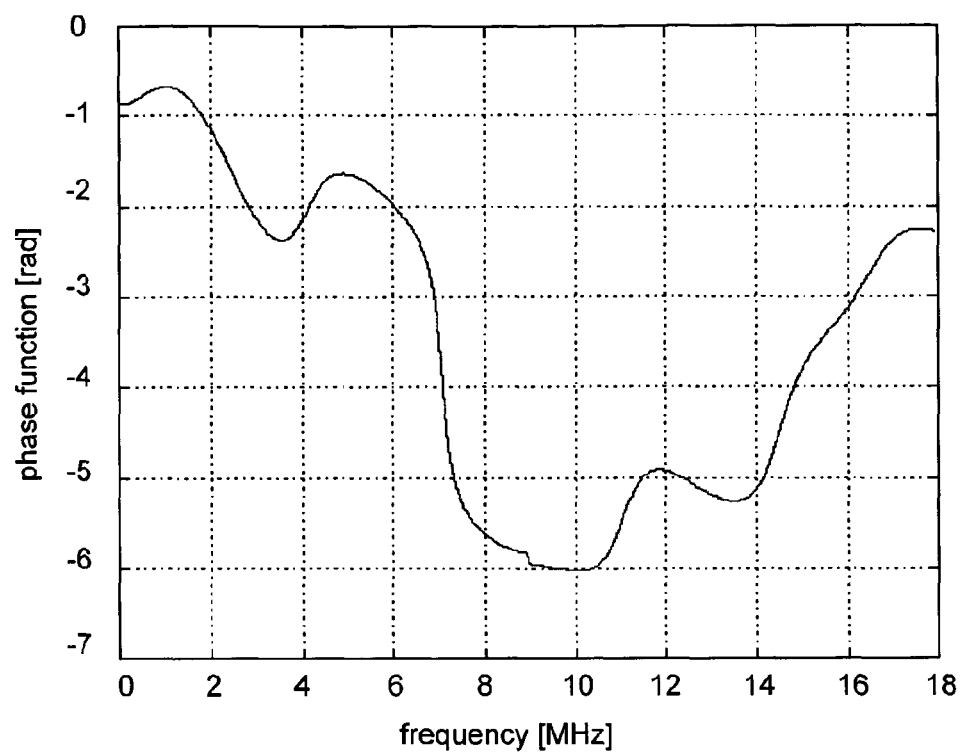
Figure 5D:
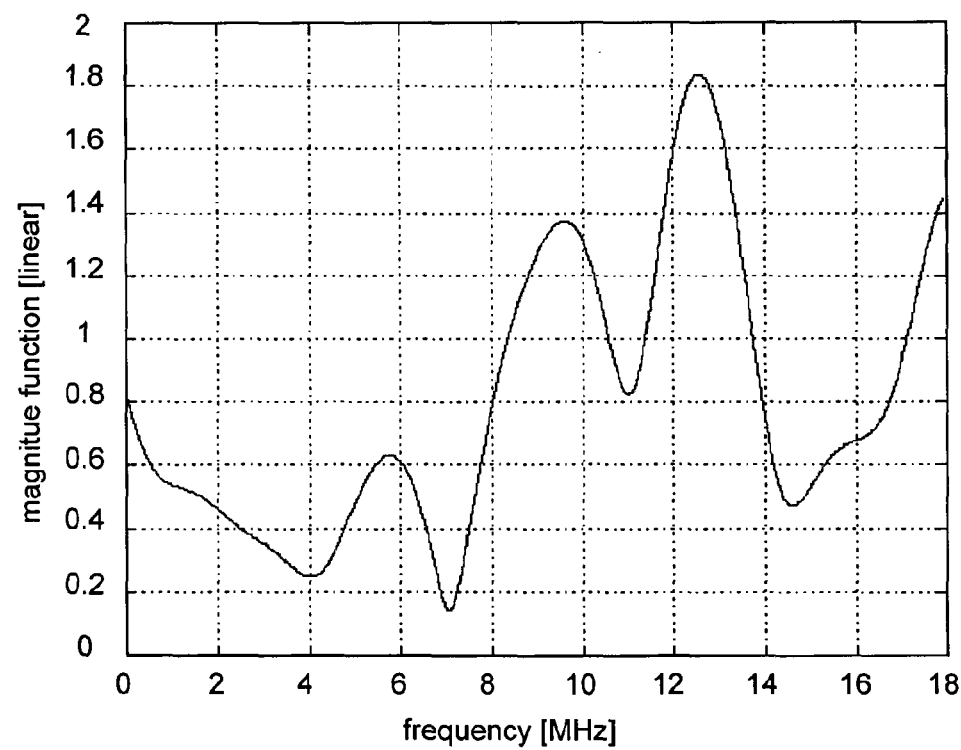

If the average phase rotation is estimated and removed, the result will be as illustrated in FIG. 5d. It is emphasized that the result in FIG. 5d will be the same regardless of whether the FFT-window is shifted to adjust for the phase rotation or not. The important thing in this context is that the average phase rotation is removed and that no ISI is present due to the FFT-window placement.

Furthermore, the presence of noise may also cause additional crossings of the real and/or imaginary axis, which in turn leads to an over-estimation of the delay spread. This phenomenon may be particularly pronounced if the noise level of the received signal after FFT-processing is high in relation to the signal strength, or if the number of zero crossings caused by the delay spread are quite few, which may be the case when the delay spread is small.

In the latter case, when the number of zero crossings caused by the delay spread are quite few, the transfer function may be close to an axis for a considerable part of the measured samples, or even close to the origin. This provides for that even a small amount of noise may cause a lot of extra zero crossings.

Embodiments of the invention will now be described, in which the delay spread of a channel is estimated by considering phase changes of the channel in the frequency domain, that is, the transfer function of the channel. According to some embodiments of the invention, the phase changes are determined by calculating the number of times the complex transfer function crosses the real and imaginary axes, respectively. This allows for an implementation that requires a minimum of computational complexity as well as a minimum amount of memory. This algorithm is commonly referred to as a zero-crossing algorithm and the number of zero crossings per frequency unit is referred to as the zero-crossing rate, ZCR.

In embodiments of the invention, the ZCR is determined after the phase rotation over the sub-carriers, caused by early (or late) FFT-window placement, has been removed.

As explained above, the placement of the FFT-window will have an impact on how the phase is changed across the sub-carriers. For example, shifting the FFT-window by one sample may cause the phase to shift a full rotation if considered from the lowest to the highest sub-carrier at the FFT-output. According to some embodiments of the invention, the average phase rotation across the sub-carriers may be estimated and removed, before starting the actual delay spread estimation to avoid over-estimation of the delay spread.

Example principles of estimating the phase rotation are disclosed in WO 2006/111276 A1, and example principles of determining and adjusting a placement of the FFT-window are disclosed in a European patent application to Telefonaktiebolaget LM Ericsson (publ.) with the title "Method and apparatus for positioning an FFT-window in an OFDM-receiver", having U.S. application Ser. No. 12/746,518, and filed at the same date as the current application.

According to some embodiments of the invention, the FFT-window placement is assumed to be known. In these embodiments, the phase rotation due to FFT-window placement is directly obtainable from the knowledge of the FFT-window placement and need not be estimated. One example of such a scenario is when a pre-FFT algorithm, which may be based on e.g. correlation with the CP, positions the FFT-window. Then, it may be assumed that the timing, and thus the resulting frequency dependent phase rotation, is known and the phase rotation may be compensated accordingly without first having to be estimated.

In some embodiments of the invention, the phase rotation, caused by the early (or late) FFT-window placement and the delay spread of the channel, is estimated by studying the rotation component of the estimated transfer function (based on the FFT-output signal) in an IQ-plane.

In other embodiments of the invention, the phase rotation, caused by the early (or late) FFT-window placement and the delay spread of the channel, is estimated by determining an average slope of the transfer function in a phase-frequency diagram. For example, phase differences between subsequent sub-carriers may be evaluated and averaged to determine the phase rotation.

In some embodiments of the invention, the estimated phase rotation is an average phase rotation. In these embodiments, the average may be taken over one OFDM-symbol (over the different sub-carriers, i.e. in the frequency direction), and/or over several OFDM-symbols (i.e. in the time direction).

According to some embodiments of the invention, the phase rotation is removed by changing the order in which the samples in the FFT-window are fed to the FFT. If, for example, the FFT-window is placed one sample early (i.e. including one sample of the CP and excluding the last sample of the useful part of the OFDM-symbol), this causes a full rotation ($2\pi$) over the N sub-carriers. Thus, by estimating the number of full rotations over the N sub-carriers (or an average phase rotation per sub-carrier), it can be determined how many samples must be shifted before applying the FFT. If the FFT-window was placed early, the samples are shifted from the beginning to the end of the OFDM-symbol. If the FFT-window was placed late, samples may be shifted from the end to the beginning of the OFDM-symbol to remove the frequency dependent phase rotation. It should be noted, however, that in this latter case ISI and/or inter-carrier interference (ICI) remains a serious problem even after the phase rotation has been removed.

According to other embodiments of the invention, the phase rotation is removed by multiplying the signal at the output of the FFT with a frequency dependent phase, that is, by de-rotating the signal. The signal may be de-rotated, for example, by multiplying the FFT-output signal by a frequency dependent phase, such as $\exp(j2\pi n\epsilon/N)$, where n denotes the $n^{th}$ carrier, and $\epsilon$ has been estimated based on the phase rotation as described above. When the phase rotation is entirely due to an erroneously placed FFT-window, E is the FFT-window offset in number of samples.

The compensation for the average phase rotation may be applied to a subsequent OFDM-symbol. Alternatively or additionally, the compensation for the average phase rotation may be applied to the current OFDM-symbol. For example, in the latter case, samples may be shifted in the current OFDM-symbol and the FFT be re-applied before continuing the processing of the current OFDM-symbol.

In some embodiments of the invention, the delay spread estimation comprises counting the total number of axis (zero) crossings of both the real axis and the imaginary axis. The delay spread of the channel, $\tau$, may be estimated as $\tau = C \cdot ZCR$, where ZCR is the zero-crossing rate measured in number of crossings per frequency unit. The constant C depends on how the delay spread is defined (e.g., root mean square (rms) delay spread, excess delay, maximum delay spread, etc) and also on the method used to count the axis crossings. The relation parameter C may, for example, be estimated by means of simulation. According to some embodiments of the invention, C could be set to a value between 0.01 and 1. According to some embodiments of the invention, C could be set to 0.26 if the root mean square delay spread should be estimated and if ZCR is given in number of crossings per MHz and $\tau$ is in $\mu s$. It is emphasized, however, that other values of C may be applicable in other embodiments of the invention, and that C=0.26 is only brought forward as an example value.

The accuracy of the delay spread estimation may increase with a higher number of registered zero crossings, which may give a more accurate value of the ZCR. The ZCR may therefore, according to some embodiments of the invention, be estimated using more than one OFDM-symbol. The ZCR may for example be estimated by the average ZCR for a number of OFDM-symbols, or by filtering the ZCR or the number of zero crossings determined for each OFDM-symbol.

Figure 3:
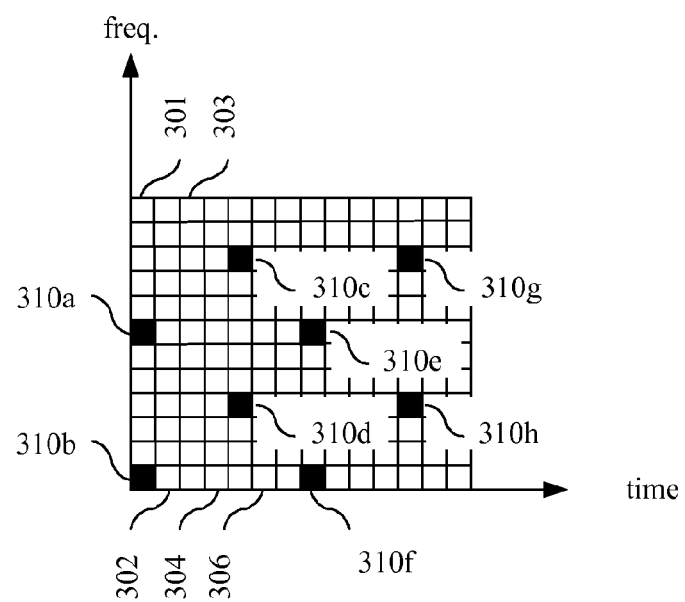
FIG. 3 is a diagram illustrating example pilot symbol placements in OFDM-signals.

To exemplify, suppose that ZCR is estimated using OFDM-symbol (301) in FIG. 3, and that the number of registered zeros crossings is small. Then OFDM-symbol (305), where pilot symbols are also transmitted, may be used for improving the estimate. Naturally, this may be extended to any desirable number of OFDM-symbols, and OFDM-symbols not containing pilot symbols may also be used.

In some embodiments of the invention, the number of OFDM-symbols to be used for estimating the delay spread is based on the required accuracy of the delay spread estimate. For example, if the required accuracy is high, more OFDM-symbols may be used than if the required accuracy is low. In some embodiments of the invention, the filter coefficients in a filter used to filter the ZCR or the number of zero crossings are determined based on the required accuracy of the delay spread estimate.

Alternatively or additionally, a Doppler spread estimate may indicate whether it is beneficial to use more than one OFDM-symbol in the estimation process. The benefit of filtering or averaging is more pronounced the larger the Doppler spread is. If the estimated Doppler spread is low, the channel will not change much between OFDM-symbols, and filtering would mainly help to average out noise. If, however, the estimated Doppler spread is high, averaging or filtering the delay spread estimates results in a more reliable estimate as the channel may vary substantially from symbol to symbol in this case.

FIG. 6 is a flow chart illustrating an example method 600 for calculating a delay spread estimate according to some embodiments of the invention. In step 610, an initial placement of the FFT-window is determined in relation to OFDM-symbols contained in a received OFDM-signal. The method may use one or more OFDM-symbols to determine the FFT-window placement. The method may, for example, take an expected or estimated amount of inter-symbol interference into account when determining the FFT-window placement. The method may also use a previous delay spread estimate when determining the FFT-window placement. The placement of the FFT-window in step 610 may be performed by a pre-FFT algorithm.

Before the FFT-window placement is determined, a frequency offset may be estimated and compensated for. The estimation may, for example, be done via a correlation with regard to the CP or by utilizing a synchronization channel, such as SCH in UMTS LTE. The frequency offset compensation may, for example, be accomplished through a digital rotator or in the analogue domain by feedback to a voltage controlled oscillator (VCO). Such operations are also well known in the art.

Then, the initial position for the FFT-window is found in step 610, for example through a correlation with the CP. Such methods are well known in the art and examples may be found, e.g. in J.-J. van de Beek, et. al., "A Time and Frequency Synchronization Scheme for Multiuser OFDM", IEEE Journal on Selected Areas in Communications, vol. 17, no. 11, November 1999. Depending on various circumstances such as the channel conditions, the initial position might be good or it might need adjustment. The requirement on the placement of the FFT-window at this stage may be that it should be good enough to allow for useful processing of the signal after the FFT. For example, there may be requirements on the amount of ISI that is allowable.

When the FFT-window placement has been determined in step 610, the method continues to step 620, where the determined FFT-window placement is applied to the OFDM-signal to obtain an OFDM-symbol. This OFDM-symbol may be the same OFDM-symbol as was used for determining the FFT-window placement in step 610 (or one of the OFDM-symbols used in step 610 if more than one OFDM-symbols were used in step 610), or it may be a subsequent OFDM-symbol. The samples in the FFT-window are re-ordered based on a frequency dependent phase rotation estimate in step 630 if the frequency dependent phase rotation has been estimated as explained above. If no frequency dependent phase rotation estimate exists yet, step 630 is merely by-passed.

A fast Fourier transfer (FFT) is applied to the (possibly re-ordered) samples of the OFDM-symbol in step 640, and the signal output from the FFT calculation is used to determine the frequency dependent phase rotation in step 650 using methods as explained above. In some embodiments, an average frequency dependent phase rotation is determined The determined frequency dependent phase rotation may be input to step 630 to be used in the processing of a subsequent OFDM-symbol, or for further processing of the same OFDM-symbol. In some embodiments, the process returns to step 630 where the samples are re-ordered in the OFDM-symbol under consideration and then the FFT is re-applied to the OFDM-symbol in step 640 before continuing the processing of the OFDM-symbol in step 670.

The determination of the frequency dependent phase rotation in step 650 may be based on channel estimates, for example in the form of an estimate of the transfer function of the channel. The channel estimates may, for example, be calculated from the pilot symbols (if any) in the OFDM-symbol. In such a case, the positions of the pilot symbols must be determined. In the example of FIG. 3, pilot symbols are only available in the first and in the fifth OFDM-symbol in a slot. Thus, in such cases, one must know which one of the OFDM-symbols is currently being processed in order to know if there are any pilot symbols available. With knowledge of where the pilot symbols are located in the time-frequency grid, the channel can be estimated for these positions using methods well known in the art. In some embodiments, the channel estimation may (alternatively or additionally) be based on non-pilot symbols of an OFDM-symbol.

Then, in step 670, the number of zero crossings is determined for the transfer function when the frequency dependent phase rotation has been removed. The ZCR may be estimated in either step 670 or step 690 and the ZCR estimation is calculated based on the determined number of zero crossings. In step 690, the delay spread of the channel is estimated based on the ZCR, and the method may return to step 620 where the processing of a new OFDM-symbol commences. In some embodiments of the invention, the method returns to step 610 instead of step 620. In such embodiments, the FFT-window placement is re-determined before the processing of a new OFDM-symbol commences in step 620.

As explained above, the delay spread estimate may be calculated based on more than one OFDM-symbol according to some embodiments of the invention. This is exemplified in FIG. 6 by optional step 680. In step 680 it is tested if an appropriate number of OFDM-symbols have been processed to produce a delay spread estimate. If not enough OFDM-symbols have been processed (NO path out of step 680), the method returns to step 620 where a new OFDM-symbol is processed. If, however, an appropriate number of OFDM-symbols have been processed (YES path out of step 680), the method proceeds to step 690 where the delay spread estimate is calculated based on the number of zero crossings for all of the processed OFDM-symbols. As explained above, the ZCR may be estimated in either step 670 or step 690. Furthermore, the ZCR may be estimated either for each processed OFDM-symbol and the delay spread estimation be based on one or more of the ZCR estimations, or a joint ZCR estimation may be calculated taking into account all of the processed OFDM-symbol. In some embodiments, the estimated ZCR (or the determined number of zero crossings) is filtered before using it to estimate the delay spread. As a further alternative, an intermediate delay spread estimate may be calculated for each processed OFDM-symbol, and filtered to obtain the final delay spread estimate.

An alternative solution is shown in FIG. 7, which is a flow chart illustrating an example method 700 for calculating a delay spread estimate according to some embodiments of the invention. Step 710 and step 720 may determine an FFT-window placement and apply the FFT-window to an OFDM-signal in the same manner as step 610 and 620 of FIG. 6 respectively.

An FFT is then applied to the samples of the OFDM-symbol in the FFT-window in step 740, and the signal output from the FFT calculation is used to determine a frequency dependent phase rotation in step 750 using methods as explained above. In step 760, the determined frequency dependent phase rotation is removed from the FFT-output signal. For example, the FFT-output signal may undergo a de-rotation process to remove the frequency dependent phase rotation.

Then, in step 770, the number of zero crossings is determined for the de-rotated FFT-output signal. The ZCR may be estimated in either step 770 or step 790 and the ZCR estimation is calculated based on the determined number of zero crossings. In step 790, the delay spread of the channel is estimated based on the ZCR, and the method may return to step 710 or step 720 (similarly to the operations described in connection to FIG. 6) where the processing of a new OFDM-symbol commences.

As explained above, the delay spread estimate may be calculated based on more than one OFDM-symbol according to some embodiments of the invention. This is exemplified in FIG. 7 by optional step 780, in which it is tested if an appropriate number of OFDM-symbols have been processed to produce a delay spread estimate. NO path out of step 780 takes the method back to step 720 where a new OFDM-symbol is processed. YES path out of step 780 takes the method further to step 790 where the delay spread estimate is calculated based on the number of zero crossings for all the processed OFDM-symbols. Furthermore, the ZCR and/or the delay spread may be estimated and/or filtered according to any of the various alternatives presented in connection to FIG. 6.

In some embodiments, such as those described by FIGS. 6 and 7, the determination of the frequency dependent phase rotation may be performed for every OFDM-symbol or for just some OFDM-symbols (for example, those comprising pilot symbols). When the determination is performed for just some OFDM-symbols, the determined values may be used also for the OFDM-symbols where no determination is made. The same principle applies to the delay spread estimation.

Furthermore, it is emphasized that the entire process described in connection to FIGS. 6 and 7 may be carried out using a single OFDM-symbol. Thus, in that case, the same OFDM-symbol is used for the initial placement of the FFT-window, and for determining the frequency dependent phase rotation and calculating the delay spread estimation after the FFT has been applied. In other embodiments, different or multiple OFDM-symbols may be used in the different stages of the process.

According to some embodiments of the invention, only one of the axes, either the real or the imaginary one, is considered when counting axis crossings.

In yet some embodiments of the invention, a hysteresis is introduced for counting axis crossings. In these embodiments, an axis crossing is counted only if the previous axis crossing was a crossing of the other axis.

Figure 8:
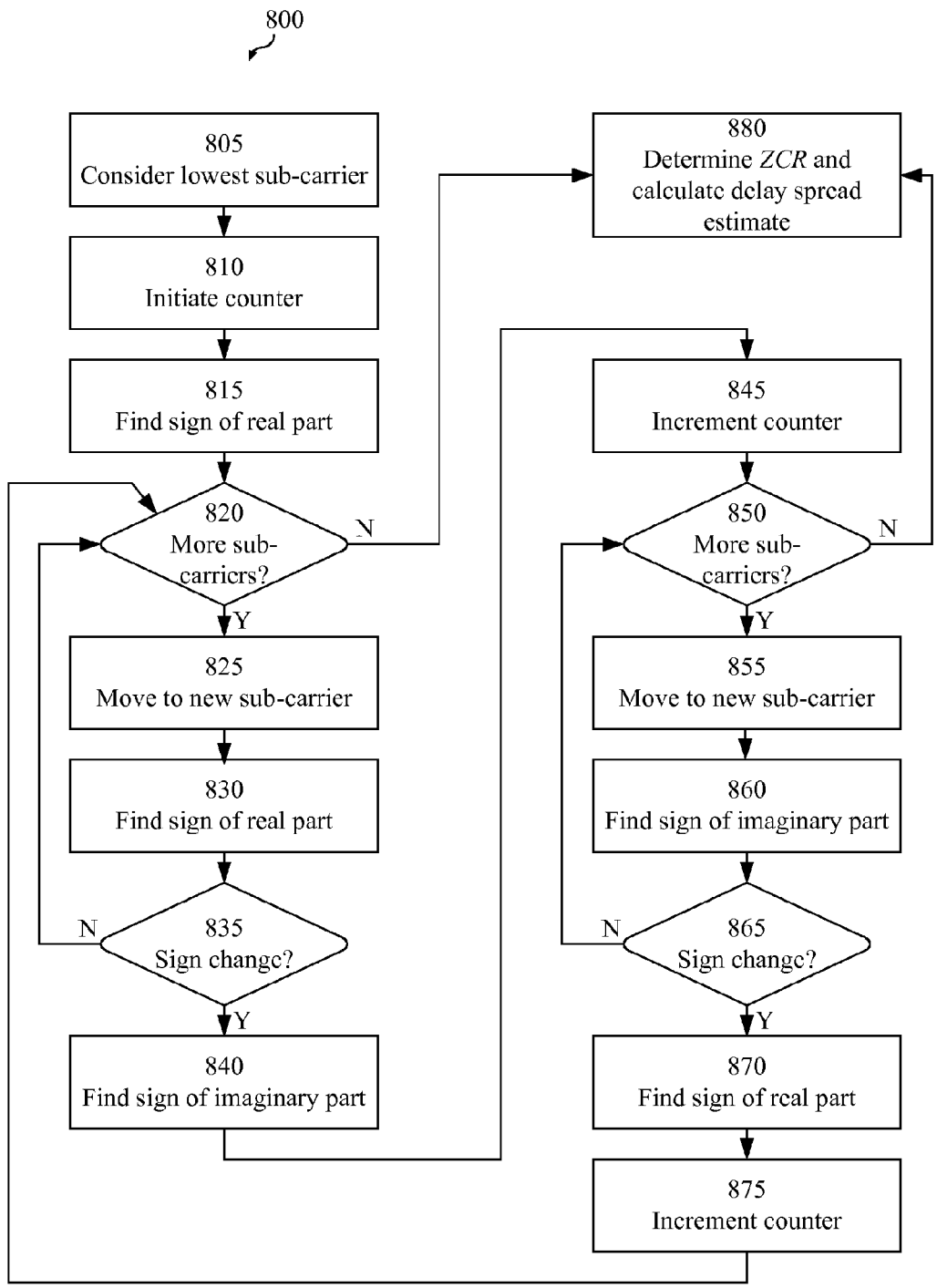
FIG. 8 is a flow chart illustrating a zero-crossing rate method with hysteresis for calculating a delay spread estimate according to some embodiments of the invention.

FIG. 8 illustrates an example method 800 for estimating the number of zero crossings and the delay spread using a hysteresis. The method 800 may, for example be part of the execution of method steps 670 and 690 of FIG. 6 or 770 and 790 of FIG. 7. In step 805, the sub-carrier at the lowest frequency where a pilot symbol is available is considered and in step 810, an axis crossing count is initiated to zero. It should be noted that it would be possible to start with another sub-carrier, such as the one at the highest frequency where a pilot symbol is available. In step 815 the sign of the real part of the channel is found for the sub-carrier under consideration.

As long as not all sub-carriers with a pilot symbol have been considered (YES path out of 820), the process continues to step 825 where the algorithm now considers the sub-carrier at the lowest frequency where a pilot symbol is available, which has not yet been considered. The sign of the real part of the channel is found for the sub-carrier under consideration in step 830. If the sign has not changed (NO path out of 835), the process returns to 820. If, on the other hand, the sign has changed (YES path out of 835), the sign of the imaginary part of the channel is found for the sub-carrier under consideration in step 840, and the zero-crossing count is incremented by one in step 845.

As long as not all sub-carriers with a pilot symbol have been considered (YES path out of 850), the process continues to step 855 where the algorithm now considers the sub-carrier at the lowest frequency where a pilot symbol is available, which has not yet been considered. The sign of the imaginary part of the channel is found for the sub-carrier under consideration in step 860. If the sign has not changed (NO path out of 865), the process returns to 850. If, on the other hand, the sign has changed (YES path out of 865), the sign of the imaginary part of the channel is found for the sub-carrier under consideration in step 870, and the zero-crossing count is incremented by one in step 875. Then the process returns to 820.

When all sub-carriers with a pilot symbol have been considered (NO paths out of 820 and 850), the ZCR is found as the total number of zero crossings divided by the total bandwidth and the delay spread is estimated as, for example, $\tau = C \cdot ZCR$ in step 880. According to some embodiments of the invention, C could be set to a value between 0.01 and 1. According to some embodiments of the invention, C could be set to 0.45 if ZCR is given in number of crossings per MHz and $\tau$ is in $\mu s$.

As can be seen from the above algorithm, the zero crossings are counted alternating between the real and the imaginary part. Clearly, one could instead have started with the imaginary part in step 815, or one could have considered both the real and the imaginary part in step 815, and chosen to start with the one which first gave a change of the sign. The delay spread estimation becomes more accurate if there are a large number of zero crossings. When the number of zero crossings is much larger than one, the initiation of method 800 has little impact on the final result.

It is apparent to those skilled in the art that the example method described in connection to FIG. 8 may be combined with any of the alternative example methods described in connection with FIGS. 6 and 7.

It has been found that using $\tau = C \cdot ZCR$, where C has a constant value as described above might over-estimate the delay spread under some circumstances. As described above, this may be the case when the delay spread is small and/or the SNR is low. If the delay spread is small, the transfer function may be close to an axis, or even close to the origin, which results in that a lot of zero crossings may be caused even by a small amount of noise. If the SNR is low, the noise level is so pronounced that it may cause a lot of zero crossings. This is illustrated in FIGS. 9 and 10.

Figure 9:
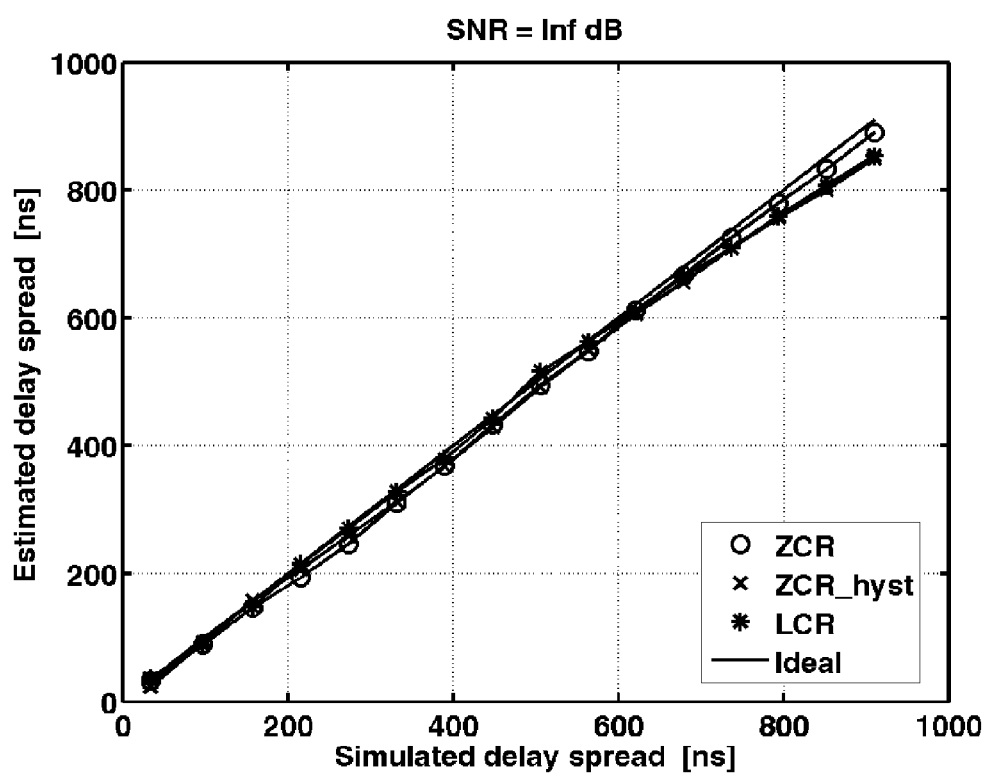
FIG. 9 is a graph of example delay spread estimation results.

FIG. 9 illustrates the performance of delay spread estimators based on the zero-crossing rate algorithms with and without hysteresis (ZCR_hyst and ZCR). The figure also illustrates the performance of a delay spread estimator based on the level-crossing rate (LCR), and a perfect delay spread estimation (Ideal). There is no noise present in these simulations, and it is seen that the results are very good for all the estimators.

Figure 10:
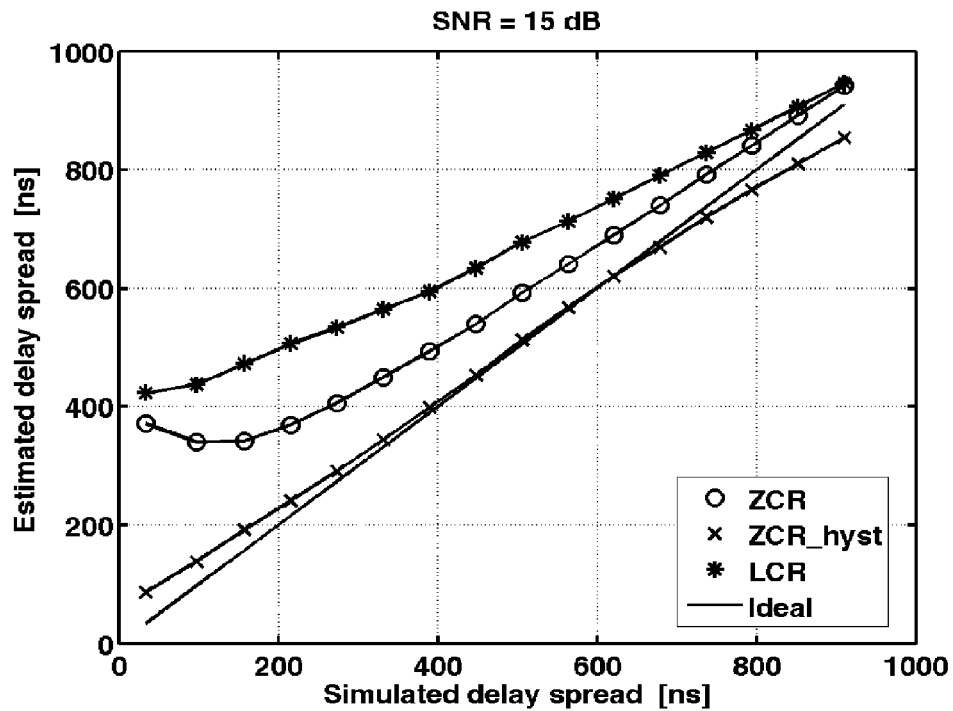
FIG. 10 is a graph of example delay spread estimation results.

In FIG. 10, the performance is illustrated for the same estimators. However, in this figure, noise is also present. It is seen that the zero-crossing delay spread estimator with hysteresis is clearly outperforming the other two in this environment, in particular for small delay spread values for all three algorithms. It is also seen that the delay spread is over-estimated to different extents for small delay spread values. For large delay spread values, the delay spread is slightly over-estimated for the algorithms without hysteresis, and slightly under-estimated for the zero-crossing rate algorithm with hysteresis.

To overcome these over- and/or under-estimation problems, some embodiments of the invention employ an alternative relationship between the delay spread $\tau$ and the zero-crossing rate ZCR. In these embodiments, the delay spread is estimated as $\tau = f(SNR, ZCR) \cdot ZCR$, where $f(SNR, ZCR)$ is a function that depends on both SNR and ZCR in a way that may have been determined beforehand by means of, for instance, simulations. In other embodiments, the function $f(SNR, ZCR)$ may be adaptively variable during the delay spread estimation. In yet other embodiments, the function may depend on only SNR or on only ZCR.

Embodiments of the invention may take into account the fact that the delay spread tends to be over-estimated when the SNR is small by determining, given a certain ZCR, that the channel has a smaller delay spread than for a larger SNR. Embodiments of the invention may also or alternatively take into account the fact that the delay spread tends to be over-estimated when the ZCR is small.

One example function $f(SNR, ZCR)$ might be $f(SNR, ZCR) = 0.37$ if $SNR \geq 20$ dB, $f(SNR, ZCR) = 0.2$ if $SNR < 20$ dB and $ZCR < 1$, and $f(SNR, ZCR) = 0.3$ if $SNR < 20$ dB and $ZCR \geq 1$. Hence, in this example, the original linear relation is used when the SNR is high, but for lower SNR a smaller scaling factor is used in order to compensate for the expected over-estimation. Since the over-estimation may be particularly pronounced for small values of the ZCR, see FIG. 10, the scaling factor may be chosen significantly smaller for smaller values of the ZCR, and only slightly smaller for somewhat larger values of the ZCR.

In some embodiments of the invention, compensating for expected over- and/or under-estimation of the delay spread may be accomplished by varying the scaling factor used to determine the delay spread estimate from the ZCR as exemplified above. According to other embodiments of the invention, the scaling factor may remain constant, and a compensation for expected over- and/or under-estimation of the delay spread may be performed by adjusting the delay spread estimate resulting from the multiplication by the scaling factor. This may, for example, be accomplished by way of a pre-computed look-up table. In the table, values of SNR and/or ZCR may correspond to an adjustment (or compensation) value x. The table may be set up in connection to designing the delay spread estimation algorithm or in connection to production of a component comprising means for performing the delay spread estimation algorithm. The table may also be set up or altered by other means, such as an upload to the apparatus storing the table. According to some embodiments of the invention, the table is set up by performing measurements on test signals with known delay spread. In some embodiments of the invention, the table values are found by means of simulation.

To further exemplify, $SNR \geq 15$ dB and $ZCR \geq 0.5$ may correspond to no compensation according to a look-up table (x=1), while 10 dB $\leq SNR \leq 15$ dB and $ZCR \geq 0.5$ may give a compensation factor of x=0.9, and all entries having either $SNR < 10$ dB or $ZCR < 0.5$ may correspond to a compensation factor of 0.6. It is emphasised that the values presented above in connection to compensation for over-estimation (either by a variable function $f(SNR, ZCR)$ or by using a look-up table) are merely examples and by no way limiting to the invention. Contrarily, particular values may be chosen based on the particular conditions in an environment where the compensation is to be applied, and optimal values may very well differ between environments. One way of determining parameter values may be to perform simulations using the applicable conditions and/or perform measurements on reference signals with devices to be used for delay estimation. Furthermore, values may also be chosen to compensate for under-estimation.

Figure 11:
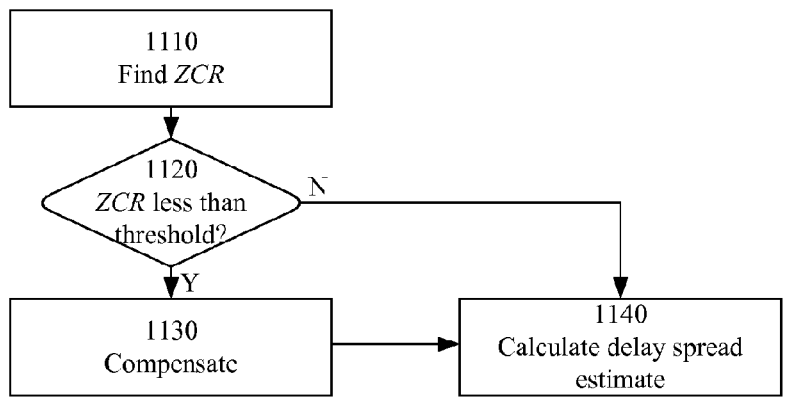
FIG. 11 is a flow chart illustrating a method for adjusting a delay spread estimate according to some embodiments of the invention.

FIG. 11 is a flow chart illustrating an example method 1100 for compensating for expected over- or under-estimation of the delay spread. The method starts in step 1110 where the ZCR is estimated. Method step 1110 may, for example, be performed as part of either of method steps 670, 690, 770, or 790 of FIGS. 6 and 7 respectively. Then, in step 1120, it is determined whether the estimated ZCR is below a threshold If that is the case (YES path out of step 1120) the method compensates, in step 1130, for an expected over-estimation for example. The compensation may be realized as an adjustment of the scaling factor $f(SNR, ZCR)$ or as multiplying by an additional adjustment factor x. Then the delay spread estimate is calculated in step 1140 using the compensation and based on the estimated ZCR. If, on the other hand, the estimated ZCR is not below the threshold $t_1$ (NO path out of step 1120) no compensation is performed and the delay spread estimate is calculated in step 1140 based on the estimated ZCR. Method steps 1120, 1130 and 1140 may, for example, be performed as part of either method step 690 of FIG. 6 or method step 790 of FIG. 7.

Knowledge of the delay spread may be useful for implementing high performing channel estimation. The delay spread estimate may, for example, be used to select a suitable filter from a bank of available filters to be used for interpolating the channel estimates between the positions of the pilot symbols. In these situations it may be sufficient to determine a rough delay spread estimate of the channel. For example it may be useful to know whether the delay spread can be categorized as small, medium, or large. In these situations, the low complexity of the disclosed embodiments for delay spread estimation may be an advantage. Accordingly, some embodiments of the invention quantize the delay spread estimate before forwarding it to other algorithms or entities, such as a channel estimator. This may, for example, be accomplished by comparing the delay spread estimate, obtained by multiplying the ZCR by the scaling factor and possibly a compensation value, with one or more thresholds and quantizing the delay spread estimate accordingly.

Some of the embodiments of the invention have been described for the situation where the delay spread was estimated using pilot symbols that are transmitted interlaced with the data. Although this may be a suitable approach when pilot symbols are placed, for example, as shown in FIG. 3, the embodiments of the invention for estimating the delay spread of the channel are by no means limited to this situation. If no pilots are available, and also in other situations, the phase rotation may be determined and the delay spread may be estimated based on estimates of the channel in other or all positions in the time-frequency grid. Furthermore, when there are pilot symbols available, and the channel has been estimated also for one or more of the sub-carriers in between the pilot symbols, these additional channel estimates may also be used for determining the phase rotation and for calculating the delay spread estimation.

Figure 12:
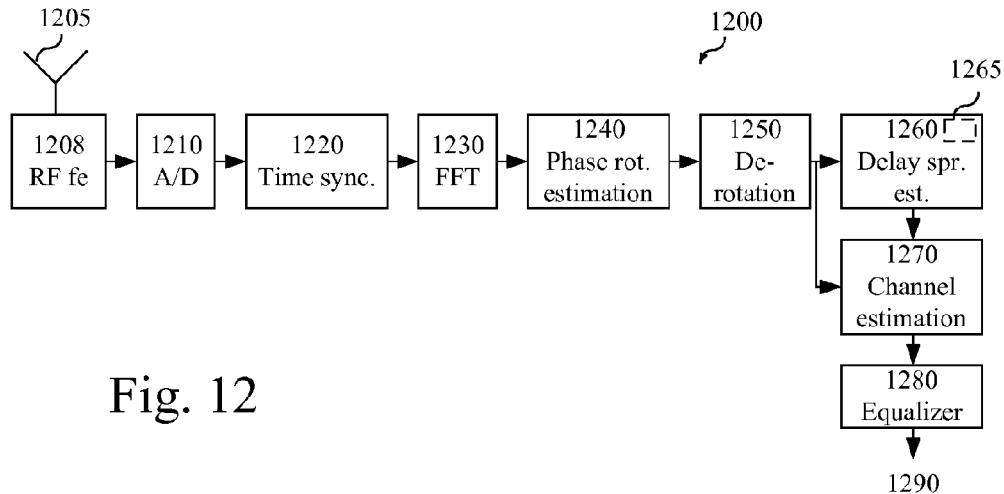
FIG. 12 is a block diagram illustrating parts of a receiver according to some embodiments of the invention.

FIG. 12 is a block diagram illustrating part of an example OFDM receiver 1200 according to some embodiments of the invention. The example receiver 1200 may, for example, be part of an electronic apparatus and may be adapted to perform one or more method steps as presented in FIGS. 7, 8 and 11.

In the example receiver 1200, an OFDM-signal comprising one or more OFDM-symbols is received by one or more antennas 1205, processed (e.g. filtered, amplified, and down-mixed to a baseband signal) by radio frequency front end (1208), and converted to a digital signal by A/D converter 1210.

In the example receiver, A/D converter is connected to block 1220, which comprises FFT-window placement circuitry, such as a time synchronization unit, adapted to determine a position of an FFT-window in relation to an OFDM-symbol.

The output of the FFT-window placement circuitry is connected to block 1230 comprising FFT circuitry, such as an FFT calculation unit, adapted to produce an FFT-output signal. The output of the FFT circuitry is connected to block 1240, which comprises circuitry, such as a phase rotation estimator, adapted to determine a frequency dependent phase rotation component of the FFT-output signal. The phase rotation estimator 1240 may also be adapted to calculate channel estimates for use in the determination of the frequency dependent phase rotation component. Alternatively, the phase rotation estimator 1240 may receive such channel estimates from another block, such as a channel estimation unit 1270 or a delay spread estimator 1250. Block 1240 is connected to block 1250, which comprises circuitry, such as a de-rotator, adapted to remove the determined frequency dependent phase rotation component from the FFT-output signal. The determined frequency dependent phase rotation may, for example be removed by de-rotating the samples of the FFT-output signal.

Block 1250 is connected to block 1260, which comprises delay spread estimation circuitry, such as a delay spread estimator. The delay spread estimation circuitry is adapted to determine a number of zero-crossings of at least one of a real component and an imaginary component of the transfer function and to calculate the delay spread estimate based on the determined number of zero-crossings. The delay spread estimation circuitry may also comprise a filter 1265 for filtering the number of zero crossings or the ZCR prior to estimating the delay spread or to filter the estimated delay spread. In some embodiments, the filter 1265 is implemented as a separate block connected to block 1260. The delay spread estimator 1260 may also be adapted to calculate channel estimates for use in the calculation of the delay spread estimate. Alternatively, the delay spread estimator 1260 may receive such channel estimates from another block, such as a channel estimation unit 1270 or a phase rotation estimator 1240.

The output of the de-rotator 1250 is also connected to block 1270, which comprises a channel estimation unit, such as a channel estimator. Thus, in this example, the channel estimator is adapted to calculate channel estimates based on the de-rotated FFT-output signals. In other examples, the channel estimator may be adapted to calculate channel estimates based on the FFT-output signals before de-rotation. In this example receiver, the channel estimation unit is also connected to block 1260, which outputs a delay spread estimate. The channel estimation unit may be adapted to estimate the channel based on at least the compensated FFT-output signal and the delay spread estimate. In other embodiments, the channel estimation unit may be adapted to estimate the channel based on at least the FFT-output signal and the delay spread estimate, and may also take the determined frequency dependent phase rotation component into account.

The channel estimation unit 1270 may be adapted to estimate the channel at some or all of the positions in the time-frequency grid of the OFDM-signal. In particular, the channel estimation unit 1270 may be adapted to determine channel estimates for the pilot positions and interpolate these channel estimates to obtain channel estimates for the non-pilot positions.

The channel estimation unit 1270 is connected to block 1280, which comprises an equalizer, whose output is forwarded to circuitry for further processing as indicated at 1290.

Figure 13:
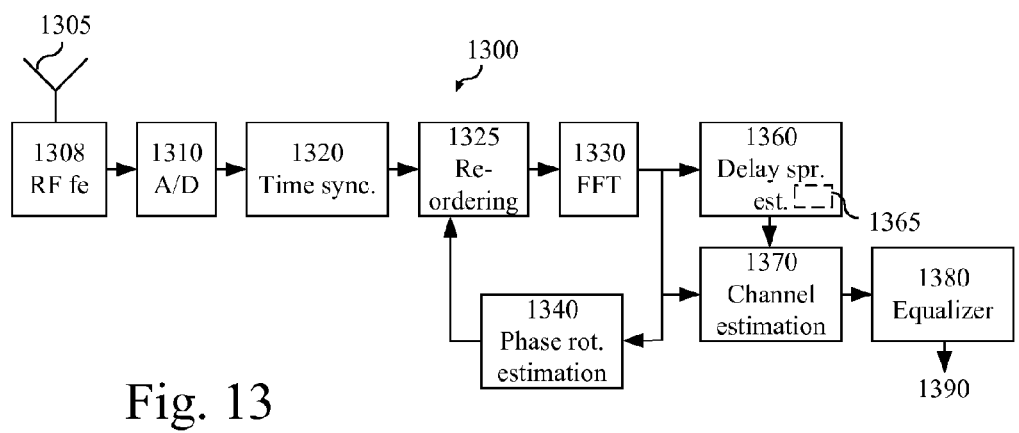
FIG. 13 is a block diagram illustrating parts of a receiver according to some embodiments of the invention.

FIG. 13 is a block diagram illustrating part of an example OFDM receiver 1300 according to some embodiments of the invention. The example receiver 1300 may, for example, be part of an electronic apparatus and may be adapted to perform one or more method steps as presented in FIGS. 6, 8 and 11.

In the example receiver 1300, an OFDM-signal comprising one or more OFDM-symbols is received by one or more antennas 1305, processed (e.g. filtered, amplified, and down-mixed to a baseband signal) by radio frequency front end (1308), and converted to a digital signal by A/D converter 1310. In the example receiver, A/D converter is connected to block 1320, which comprises FFT-window placement circuitry, such as a time synchronization unit, adapted to determine a position of an FFT-window in relation to an OFDM-symbol.

The output of the FFT-window placement circuitry is connected to block 1325, which comprises re-arranging circuitry adapted to re-order the samples output from the FFT-window placement circuitry based on a frequency dependent phase rotation estimate.

The output from block 1325 is connected to block 1330 comprising FFT circuitry, such as an FFT calculation unit, adapted to produce an FFT-output signal. The output of the FFT circuitry is connected to block 1340, which comprises circuitry, such as a phase rotation estimator, adapted to determine a frequency dependent phase rotation component of the FFT-output signal. The phase rotation estimator 1340 may also be adapted to calculate channel estimates for use in the determination of the frequency dependent phase rotation component. Alternatively, the phase rotation estimator 1340 may receive such channel estimates from another block, such as a channel estimation unit 1370 or a delay spread estimator 1350. The output of block 1340 is connected to block 1325.

FFT circuitry 1330 is also connected to block 1360, which comprises delay spread estimation circuitry, such as a delay spread estimator. The delay spread estimation circuitry is adapted to determine a number of zero-crossings of at least one of a real component and an imaginary component of the transfer function and to calculate the delay spread estimate based on the determined number of zero-crossings. The delay spread estimator 1360 may also be adapted to calculate channel estimates for use in the calculation of the delay spread estimate. Alternatively, the delay spread estimator 1360 may receive such channel estimates from another block, such as a channel estimation unit 1370 or a phase rotation estimator 1340. The delay spread estimation circuitry may also comprise a filter 1365 for filtering the number of zero crossings or the ZCR prior to estimating the delay spread or to filter the estimated delay spread. In some embodiments, the filter 1365 is implemented as a separate block connected to block 1360.

The output of the FFT circuitry 1330 is also connected to block 1370, which comprises a channel estimation unit, such as a channel estimator. In this example receiver, the channel estimation unit is also connected to block 1360, which outputs a delay spread estimate. The channel estimation unit may be adapted to estimate the channel based on at least the FFT-output signal and the delay spread estimate. The channel estimation unit 1370 may be adapted to estimate the channel at some or all of the positions in the time-frequency grid of the OFDM-signal. In particular, the channel estimation unit 1370 may be adapted to determine channel estimates for the pilot positions and interpolate these channel estimates to obtain channel estimates for the non-pilot positions.

The channel estimation unit 1370 is connected to block 1380, which comprises an equalizer, whose output is forwarded to circuitry for further processing as indicated at 1390.

In FIGS. 12 and 13, the channel estimation units 1270, 1370, the phase rotation estimator 1240 and the delay spread estimators 1260, 1360 have been portrayed as part of the signal processing flow chain. In other embodiments of the invention, one or more of these blocks may be implemented along side of (and connected to various blocks as suitable of) the signal processing flow chain.

The described embodiments of the invention and their equivalents may be performed by general-purpose circuits associated with or integral to an OFDM receiver, such as digital signal processors (DSP), central processing units (CPU), co-processor units, or by specialized circuits such as for example application-specific integrated circuits (ASIC). All such forms are contemplated to be within the scope of the invention.

The invention may be embodied within an electronic apparatus comprising a receiver having circuitry or performing methods according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, an embedded drive, a mobile gaming device, or a (wrist) watch. The electronic apparatus may alternatively be a base station in a telecommunication system.

Figure 14:
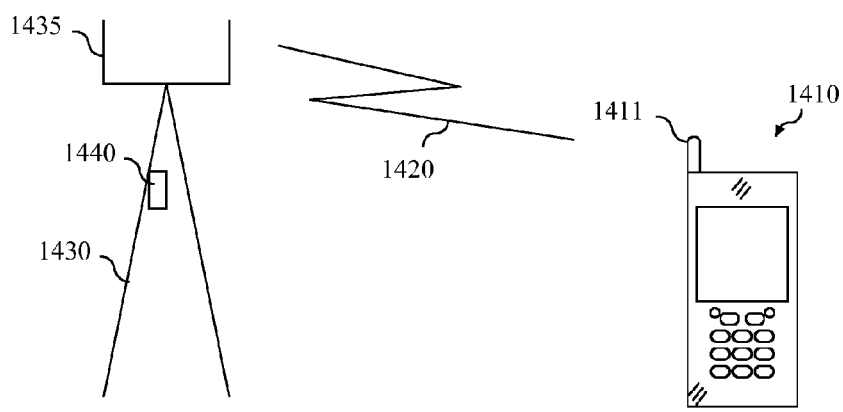
FIG. 14 is a schematic front view of a mobile terminal connected, through a radio link, to a base station site, wherein the mobile terminal and/or the base station may comprise an electronic apparatus according to some embodiments of the invention.
Figure 5A:
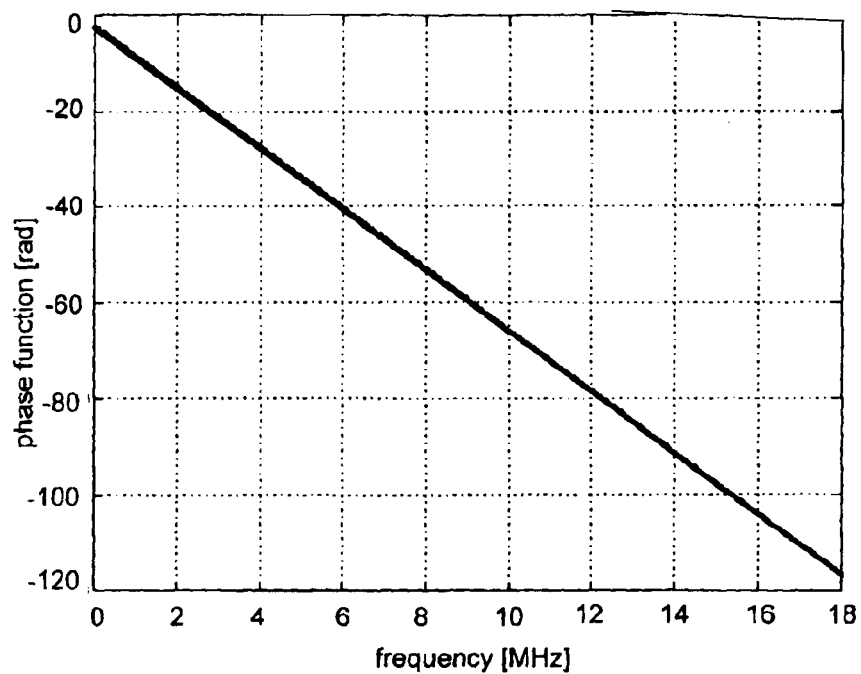
Figure 5A:
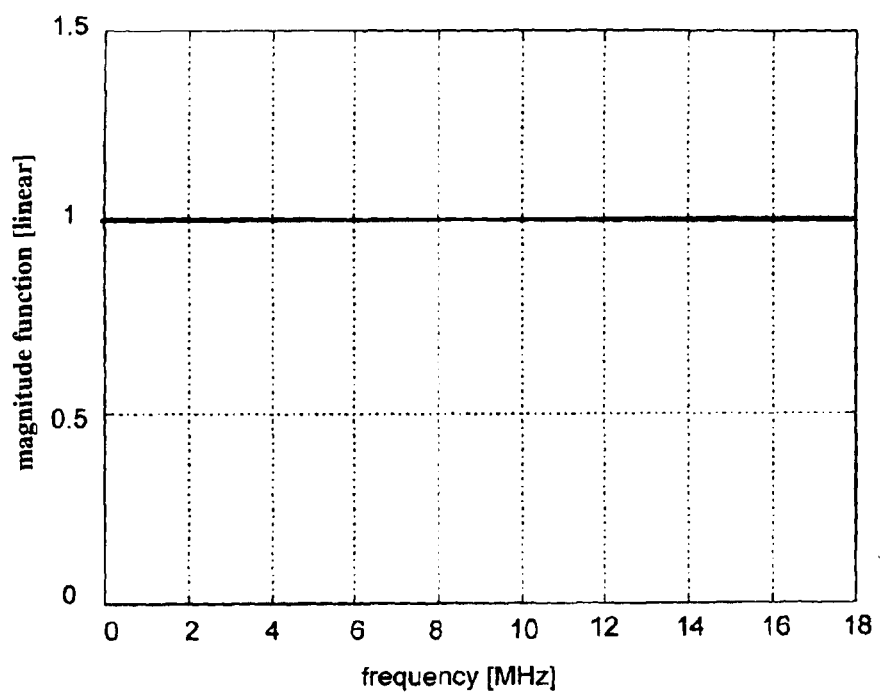
Figure 5B:
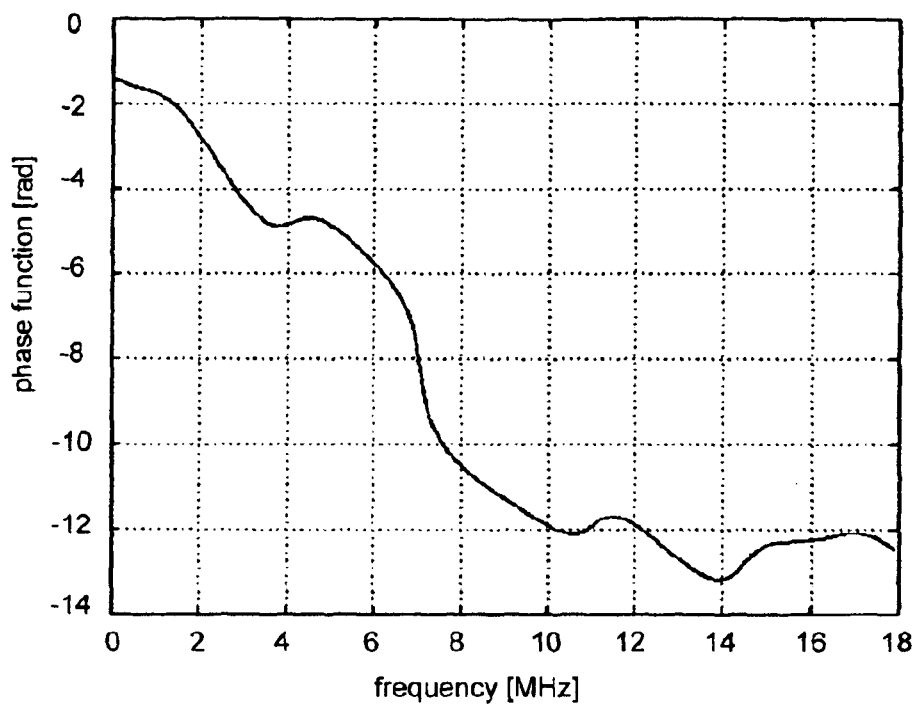
Figure 5B:
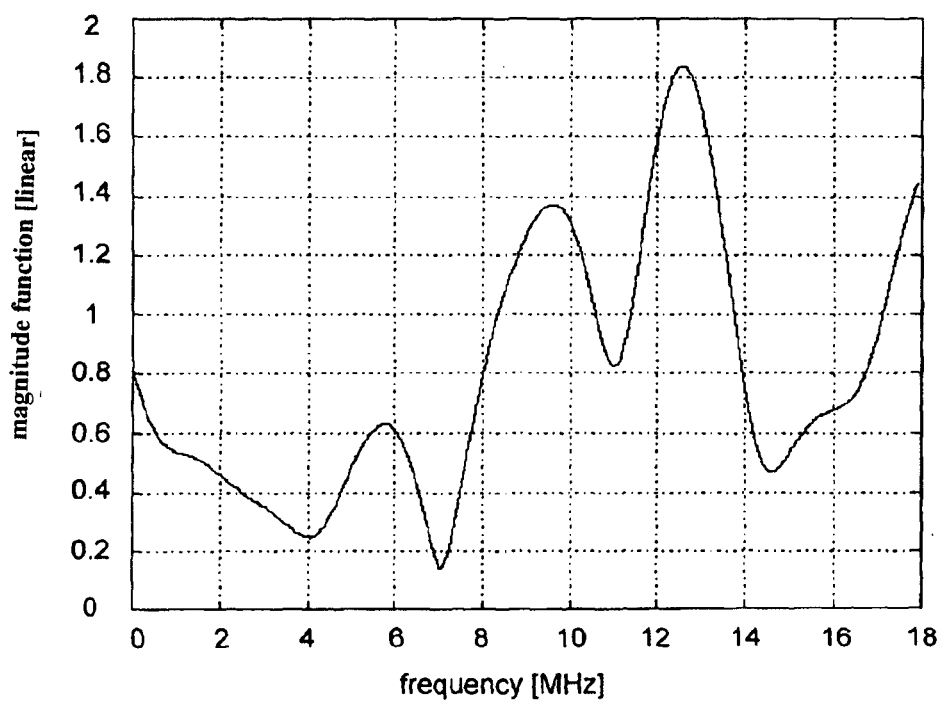

FIG. 14 illustrates an example mobile terminal 1410 connected, through a radio link 1420, to a base station site 1430. The base station site 1430 comprises one or more antennas 1435 and at least one base station 1440. The base station 1440 and/or the mobile terminal 1410 may be adapted to calculate delay spread estimates according to embodiments of the invention.

The mobile terminal 1410 is illustrated as a mobile telephone in a schematic front view. This example mobile terminal 1410 comprises an antenna 1411 mounted on the housing of the apparatus. Alternatively, the mobile terminal 1410 may have an internal antenna mounted within the housing of the apparatus. The mobile terminal 1410 may even comprise multiple antennas. The mobile terminal 1410 may further comprise a display, a keypad, a loudspeaker, and a microphone, which together provides a man-machine interface for operating the mobile terminal 1410.

The example mobile terminal 1410 is adapted to connect to a mobile telecommunication network via the wireless link 1420 to the radio base station 1440. Hence, a user of the mobile terminal 1410 may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 1410 and the base station 1440 may be compliant with at least one mobile telecommunication standard, for instance UMTS LTE. Alternatively or additionally, the mobile terminal 1410 may be adapted to connect to a digital broadcast system and to receive signals on accordance with at least one standard for digital broadcast, such as DVB-H or DAB.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in the base station 1440 and/or mobile terminal 1410. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in FIGS. 6, 7, 8, and 11.

One of the advantages of some embodiments of the invention is that a delay spread estimate is achieved which is not sensitive to over- or under-estimation due to non-perfect time synchronization (early or late FFT-window placement).

An additional advantage of some embodiments of the invention is that the delay spread estimate is robust to over- or under-estimation due to a low number of zero crossings.

A further advantage of some of the embodiments of the invention is that the delay spread estimation is robust to over- or under-estimation due to noise.

Other advantages of some embodiments of the invention are low complexity implementation and robustness to estimation errors.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the invention is construed to be limited by the appended claims and all reasonable equivalents thereof.

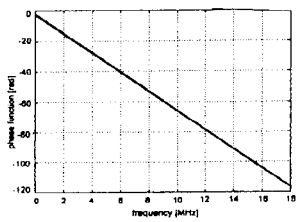

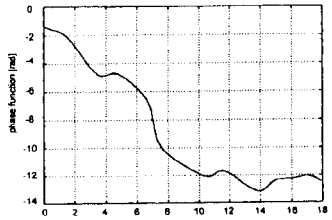

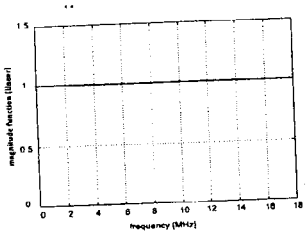

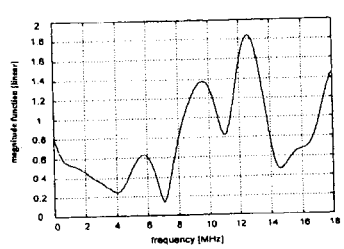

The invention claimed is:

1. A method for calculating a delay spread estimate in an Orthogonal Frequency Division Multiplexing—OFDM—receiver, comprising:
    determining a position of a fast Fourier transform—FFT—window in relation to one or more OFDM-symbols of a received OFDM-signal;
    using the determined position to obtain a first OFDM-symbol from the received OFDM-signal;

applying an FFT to the first OFDM-symbol to produce an FFT-output signal;
determining a number of zero-crossings of at least one of a real component and an imaginary component of a transfer function of a channel over which the received OFDM-signal has been transmitted;
calculating the delay spread estimate based on the determined number of zero-crossings;
determining a frequency dependent phase rotation component of the FFT-output signal; and
removing, prior to the step of determining the number of zero-crossings, the determined frequency dependent phase rotation component from the FFT-output signal to obtain a compensated FFT-output signal;
wherein the transfer function is determined based on the compensated FFT-output signal, and
wherein the step of calculating the delay spread estimate comprises:
determining a zero-crossing rate based on the determined number of zero-crossings; and
multiplying the determined zero-crossing rate by a scale factor to produce the delay spread estimate.

2. The method of claim 1, wherein the step of determining a frequency dependent phase rotation component of the FFT-output signal comprises determining an average frequency dependent phase rotation component.

3. The method of claim 1, wherein the scale factor has a constant value.

4. The method of claim 3, wherein multiplying the determined zero-crossing rate by a scale factor produces an intermediate delay spread estimate, and wherein the step of calculating the delay spread estimate further comprises adjusting the intermediate delay spread estimate based on the determined zero-crossing rate.

5. The method of claim 3, wherein multiplying the determined zero-crossing rate by a scale factor produces an intermediate delay spread estimate, and wherein the step of calculating the delay spread estimate further comprises adjusting the intermediate delay spread estimate based on the signal-to-noise level of the FFT-output signal.

6. The method of claim 1, wherein the scale factor is a function of the determined zero-crossing rate.

7. The method of claim 1, wherein the scale factor is a function of the signal-to-noise level of the FFT-output signal.

8. The method of claim 1, further comprising:
performing, for at least a second OFDM-symbol of the received OFDM-signal, at least the steps of:
using the determined position to obtain the second OFDM-symbol from the received OFDM-signal;
applying the FFT to the second OFDM-symbol to produce an FFT-output signal;
determining a frequency dependent phase rotation component of the FFT-output signal;
removing the determined frequency dependent phase rotation component from the FFT-output signal to obtain a compensated FFT-output signal; and
determining a number of zero-crossings of at least one of a real component and an imaginary component of the transfer function, wherein the transfer function is determined based on the compensated FFT-output signal;
and wherein the step of calculating the delay spread estimate based on the determined number of zero-crossings comprises calculating the delay spread estimate based on at least a determined number of zero-crossings associated with the first OFDM-symbol and a determined number of zero-crossings associated with the at least second OFDM-symbol.

9. The method of claim 8, further comprising filtering at least one of:
the determined number of zero-crossings;
a zero-crossing rate; and
the calculated delay spread estimate.

10. The method of claim 8, wherein the step of removing the determined frequency dependent phase rotation component is performed prior to the step of applying the FFT to the second OFDM-symbol and comprises re-ordering samples of the second OFDM-symbol based on the determined frequency dependent phase rotation component.

11. The method of claim 1, wherein the step of removing the determined frequency dependent phase rotation component is performed prior to the step of applying the FFT to the first OFDM-symbol and comprises re-ordering samples of the first OFDM-symbol based on the determined frequency dependent phase rotation component.

12. The method of claim 1, wherein the step of removing the determined frequency dependent phase rotation component is performed after the step of applying the FFT to the first OFDM-symbol and comprises de-rotating samples of the FFT-output signal.

13. The method of claim 1, wherein the step of determining the number of zero-crossings comprises:
initiating a counter;
incrementing the counter for a first registered zero-crossing;
iterating, for each registered zero-crossing, the steps of:
if the registered zero-crossing is a zero-crossing of the real component, incrementing the counter only if the previously registered zero-crossing was a zero-crossing of the imaginary component; and
if the registered zero-crossing is a zero-crossing of the imaginary component, incrementing the counter only if the previously registered zero-crossing was a zero-crossing of the real component.

14. The method of claim 1 further comprising quantizing the calculated delay spread estimate.

15. A nontransitory computer readable storage medium, having stored thereon a computer program comprising program instructions, the computer program being loadable into a data-processing unit and adapted to cause the data-processing unit to execute a method when the computer program is run by the data-processing unit, wherein the method is for calculating a delay spread estimate in an Orthogonal Frequency Division Multiplexing—OFDM—receiver, and wherein the method comprises:
determining a position of a fast Fourier transform—FFT—window in relation to one or more OFDM-symbols of a received OFDM-signal;
using the determined position to obtain a first OFDM-symbol from the received OFDM-signal;
applying an FFT to the first OFDM-symbol to produce an FFT-output signal;
determining a number of zero-crossings of at least one of a real component and an imaginary component of a transfer function of a channel over which the received OFDM-signal has been transmitted;
calculating the delay spread estimate based on the determined number of zero-crossings;
determining a frequency dependent phase rotation component of the FFT-output signal; and
removing, prior to the step of determining the number of zero-crossings, the determined frequency dependent phase rotation component from the FFT-output signal to obtain a compensated FFT-output signal;

wherein the transfer function is determined based on the compensated FFT-output signal, and wherein the step of calculating the delay spread estimate comprises:

determining a zero-crossing rate based on the determined number of zero-crossings; and multiplying the determined zero-crossing rate by a scale factor to produce the delay spread estimate.

16. An electronic apparatus for calculating a delay spread estimate in an Orthogonal Frequency Division Multiplexing—OFDM—receiver, comprising:

fast Fourier transform—FFT—window placement circuitry adapted to determine a position of an FFT-window in relation to one or more OFDM-symbols of a received OFDM-signal and to use the position of the FFT-window to obtain at least one OFDM-symbol from the received OFDM-signal;

FFT circuitry adapted to produce an FFT-output signal from the at least one OFDM-symbol;

at least one delay spread estimator adapted to:

determine a number of zero-crossings of at least one of a real component and an imaginary component of a transfer function of a channel over which the received OFDM-signal has been transmitted; and calculate the delay spread estimate based on the determined number of zero-crossings;

circuitry adapted to determine a frequency dependent phase rotation component of the FFT-output signal;

circuitry adapted to remove the determined frequency dependent phase rotation component from the FFT-output signal to obtain a compensated FFT-output signal; and circuitry adapted to determine the transfer function based on the compensated FFT-output signal, and wherein the at least one delay spread estimator is further adapted to:

determine a zero-crossing rate based on the determined number of zero-crossings; and multiply the determined zero-crossing rate by a scale factor.

17. The electronic apparatus of claim 16, wherein the circuitry adapted to determine a frequency dependent phase rotation component of the FFT-output signal is adapted to determine an average frequency dependent phase rotation component.

18. The electronic apparatus of claim 16, wherein the scale factor has a constant value.

19. The electronic apparatus of claim 18, wherein multiplying, in the at least one delay spread estimator, the determined zero-crossing rate by a scale factor produces an intermediate delay spread estimate, and wherein the at least one delay spread estimator is further adapted to adjust the intermediate delay spread estimate based on the determined zero-crossing rate.

20. The electronic apparatus of any claim 18, wherein multiplying, in the at least one delay spread estimator, the determined zero-crossing rate by a scale factor produces an intermediate delay spread estimate, and wherein the at least one delay spread estimator is further adapted to adjust the intermediate delay spread estimate based on the signal-to-noise level of the FFT-output signal.

21. The electronic apparatus of claim 16, wherein the scale factor is a function of the determined zero-crossing rate.

22. The electronic apparatus of claim 16, wherein the scale factor is a function of the signal-to-noise level of the FFT-output signal.

23. The electronic apparatus of claim 16, wherein the circuitry adapted to remove the determined frequency dependent phase rotation component is associated with the FFT-window placement circuitry and the FFT circuitry and is adapted to re-order samples of the at least one OFDM-symbol based on the determined frequency dependent phase rotation component.

24. The electronic apparatus of claim 16, wherein the circuitry adapted to remove the determined frequency dependent phase rotation component is adapted to de-rotate samples of the FFT-output signal.

25. The electronic apparatus of claim 16 further comprising:

a filter associated with the at least one delay spread estimator.

26. The electronic apparatus of claim 16 further comprising a channel estimator adapted to determine at least one setting of a channel estimation algorithm based on the calculated delay spread estimate.

27. The electronic apparatus of claim 16, wherein the apparatus complies with the Universal Mobile Telecommunications System Long Term Evolution standard.

28. The electronic apparatus of claim 16, wherein the electronic apparatus is a portable or handheld mobile radio communication equipment, a mobile radio terminal, a mobile telephone, a pager, a communicator, an electronic organizer, a smartphone, a computer, an embedded drive, a mobile gaming device, a watch or a base station.

* * * * *

UNITED STATES PATENT AND TRADEMARK OFFICE
CERTIFICATE OF CORRECTION

PATENT NO. : 8,472,538 B2
APPLICATION NO. : 12/746604
DATED : June 25, 2013
INVENTOR(S) : Wilhelmsson et al.

It is certified that error appears in the above-identified patent and that said Letters Patent is hereby corrected as shown below:

Delete the title page and substitute the attached title page therefor.

On the title page, in the Figure, delete "magnitue" and insert -- magnitude --, therefor each occurrence in the title page figures.

In the Drawings:

Delete drawing sheets 3 and 4 and substitute the attached drawing sheets 3 and 4 therefor.

In Fig. 5a, Sheet 3 of 11, delete "magnitue" and insert -- magnitude --, therefor.

In Fig. 5b, Sheet 4 of 11, delete "magnitue" and insert -- magnitude --, therefor.

In Fig. 5c, Sheet 5 of 11, delete "magnitue" and insert -- magnitude --, therefor.

In Fig. 5d, Sheet 6 of 11, delete "magnitue" and insert -- magnitude --, therefor.

In the Specification

In Column 8, Line 23, delete "In stead" and insert -- Instead --, therefor.

In Column 10, Line 20, delete "E" and insert -- $\varepsilon$ --, therefor.

In Column 12, Line 2, delete "detemined" and insert -- determined. --, therefor.

In Column 16, Line 23, delete "threshold If" and insert -- threshold $t_1$. If --, therefor.

Signed and Sealed this
Thirty-first Day of December, 2013

Margaret A. Focarino
*Commissioner for Patents of the United States Patent and Trademark Office*

In the Claims

In Column 24, Line 8, in Claim 20, delete "any claim" and insert -- claim --, therefor.

(12) United States Patent
Wilhelmsson et al.

(10) Patent No.: US 8,472,538 B2
(45) Date of Patent: Jun. 25, 2013

(54) METHOD AND APPARATUS FOR DELAY SPREAD ESTIMATION

(75) Inventors: Leif Wilhelmsson, Dalby (SE); Bo Bernhardsson, Lund (SE); Lars Björkman, Malmö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 362 days.

(21) Appl. No.: 12/746,604

(22) PCT Filed: Dec. 8, 2008

(86) PCT No.: PCT/EP2008/066999
§ 371 (c)(1),
(2), (4) Date: Oct. 4, 2010

(87) PCT Pub. No.: WO2009/074529
PCT Pub. Date: Jun. 18, 2009

(65) Prior Publication Data
US 2011/0019749 A1 Jan. 27, 2011

Related U.S. Application Data

(60) Provisional application No. 61/013,351, filed on Dec. 13, 2007.

(30) Foreign Application Priority Data

Dec. 10, 2007 (EP) .................................... 07122776

(51) Int. Cl.
*H04L 27/28* (2006.01)
(52) U.S. Cl.
USPC ........... 375/260; 375/259; 375/316; 375/329; 375/334; 375/340
(58) Field of Classification Search
USPC ............... 375/259, 260, 316, 324, 322, 329, 375/334, 340
See application file for complete search history.

(56) References Cited

U.S. PATENT DOCUMENTS 6,058,121 A * 5/2000 Kim et al. ................ 370/480
6,650,617 B1 * 11/2003 Belotserkovsky et al. ... 370/210
(Continued)

FOREIGN PATENT DOCUMENTS

| EP | 1 675 335 A1 | 6/2006 |
| EP | 2071787 A1 | 6/2009 |
| WO | 2006/111276 A1 | 10/2006 |

OTHER PUBLICATIONS

PCT International Search Report, dated Apr. 9, 2009, in connection with International Application No. PCT/EP2008/066999.

(Continued)

*Primary Examiner* — Kenneth Lam
(74) *Attorney, Agent, or Firm* — Potomac Patent Group PLLC

(57) ABSTRACT

Methods for calculating a delay spread estimate in an OFDM-receiver are described, along with computer program products and electronic apparatuses for performing the methods. The methods comprise determining a position of an FFT-window in relation to one or more OFDM-symbols of a received OFDM-signal and using the determined position to obtain a first OFDM-symbol from the received OFDM-signal. An FFT is applied to the first OFDM-symbol to produce an FFT-output signal. A frequency dependent phase rotation component of the FFT-output signal is determined and removed from the FFT-output signal. A number of zero-crossings of at least one of a real component and an imaginary component of a transfer function of a channel, over which the received OFDM-signal has been transmitted, derived from the FFT-output signal where the frequency dependent phase rotation component has been removed is determined, and a delay spread estimate is calculated based on the determined number of zero-crossings.

28 Claims, 11 Drawing Sheets